(12) United States Patent
Scarsbrook et al.

(10) Patent No.: US 8,468,707 B2
(45) Date of Patent: Jun. 25, 2013

(54) POLYCRYSTALLINE DIAMOND ELEMENTS HAVING CONVEX SURFACES

(75) Inventors: Geoffrey Alan Scarsbrook, Berkshire (GB); Timothy Peter Mollart, Berkshire (GB)

(73) Assignee: Element Six Limited (GB)

( * ) Notice: Subject to any disclaimer, the term of this patent is extended or adjusted under 35 U.S.C. 154(b) by 35 days.

(21) Appl. No.: 12/523,291

(22) PCT Filed: Jan. 18, 2008

(86) PCT No.: PCT/IB2008/050187
§ 371 (c)(1),
(2), (4) Date: Aug. 28, 2009

(87) PCT Pub. No.: WO2008/087610
PCT Pub. Date: Jul. 24, 2008

(65) Prior Publication Data
US 2010/0064538 A1    Mar. 18, 2010

(30) Foreign Application Priority Data
Jan. 18, 2007    (GB) .................................. 0700984.8

(51) Int. Cl.
*G01B 1/00*    (2006.01)
*G01B 5/012*    (2006.01)
*B32B 9/00*    (2006.01)

(52) U.S. Cl.
USPC ............................................. 33/559; 428/408

(58) Field of Classification Search
USPC .................. 33/503, 556, 557, 558, 559, 560, 33/561; 428/141, 408
See application file for complete search history.

(56) References Cited

U.S. PATENT DOCUMENTS

| | | | | |
|---|---|---|---|---|
| 5,108,813 A | * | 4/1992 | Noda et al. | 428/141 |
| 5,178,645 A | * | 1/1993 | Nakamura et al. | 51/293 |
| 5,633,087 A | | 5/1997 | Simpson | |

(Continued)

FOREIGN PATENT DOCUMENTS

| | | |
|---|---|---|
| DE | 131 156 | 6/1978 |
| EP | 0 699 776 A1 | 3/1996 |

(Continued)

OTHER PUBLICATIONS

Beiner et al., "Diamond Ablators for Inertial Confinement Fusion," Fusion Science and Technology, vol. 49 (4), May 2006, pp. 737-742.

(Continued)

*Primary Examiner* — R. A. Smith
(74) *Attorney, Agent, or Firm* — Bryan Cave LLP

(57) ABSTRACT

A diamond element (10) having a convex surface is disclosed, the convex surface including a spherical segment for which the maximum peak to valley deviation from a perfect spherical surface is less than about 5 µm. The diamond element (10) may be a solid polycrystalline diamond material and/or may comprise base material which is coated with diamond. Alternatively or in addition, the RMS deviation from a perfect spherical surface may be less than about 500 nm, or the RMS roughness less than about 30 nm. A diamond element (10) with a radius of curvature less than about 20 mm is also disclosed. In one aspect a diamond element (10) having a conical half-angle greater than about 10° is described. Diamond elements (10) of this type are intended for use as metrology tips.

7 Claims, 6 Drawing Sheets

U.S. PATENT DOCUMENTS

| | | | |
|---|---|---|---|
| 5,874,130 A | | 2/1999 | Tanabe et al. |
| 5,967,250 A | * | 10/1999 | Lund et al. ............... 175/428 |
| 6,183,818 B1 | * | 2/2001 | Vohra et al. ............... 427/577 |
| 6,410,877 B1 | | 6/2002 | Dixon et al. |
| 6,447,912 B1 | | 9/2002 | Mikus et al. |
| 6,450,271 B1 | * | 9/2002 | Tibbitts et al. ............ 175/374 |
| 7,556,456 B2 | * | 7/2009 | Yoshinaga et al. ......... 407/118 |
| 7,799,427 B2 | * | 9/2010 | Gill et al. .................. 428/408 |
| 2004/0047270 A1 | | 3/2004 | Takeda et al. |
| 2006/0237639 A1 | * | 10/2006 | Kley ........................ 250/234 |
| 2010/0146865 A1 | * | 6/2010 | Sato et al. ................. 51/307 |

FOREIGN PATENT DOCUMENTS

| | | | |
|---|---|---|---|
| EP | 1 079 201 A2 | | 2/2001 |
| EP | 1 202 022 A1 | | 5/2002 |
| EP | 1 649 955 A1 | | 4/2006 |
| GB | 1 347 972 | | 2/1974 |
| GB | 2 243 688 A | | 11/1991 |
| JP | 04076401 | | 3/1992 |
| JP | 2006201105 A | * | 8/2006 |
| JP | 2006 297458 A | | 11/2006 |
| WO | 99/21060 A1 | | 4/1999 |
| WO | 01/87176 A1 | | 11/2001 |
| WO | 03 052174 A2 | | 6/2003 |
| WO | 2007 007126 | | 1/2007 |

OTHER PUBLICATIONS

Gu et al., "Reflection/transmission confocal microscopy characterization of single-crystal diamond microlens arrays," Applied Physics Letters, AIP, vol. 84(15), Apr. 12, 2004, pp. 2754-2756.

Hutchings, I.M., "Tribology: Friction and Wear of Engineering Materials," Edward Arnold publ., 1992, pp. 8-9.

Karlsson et al., "Diamond Micro-Optics: Microlenses and Antireflection Strutured Surfaces for the Infrared Spectral Region," Optic Express, vol. 11(5), 2003, pp. 502-507.

Tominaga et al., Section 4.2: "Solid Immersion Lens (SIL) and Its Related Technologies," Optical Near-Field Recording, Springer-Verlag, Berlin Heidelberg, 2005, pp. 71-76.

International Search Report for PCT/IB2008/050187 dated Jun. 18, 2008.

UK Search Report for GB 0700984.8 dated Jul. 24, 2007.

"Cermet", Wikipedia, as accessed Oct. 25, 2011 from the website.

"Cemented carbide", Wikipedia, as accessed Oct. 25, 2011 from the website.

* cited by examiner

☒ Aluminium　　☒ Sphere

☒ Aluminium　　☒ Diamond coated

☒ Aluminium　　☒ Diamond coated

POLYCRYSTALLINE DIAMOND ELEMENTS HAVING CONVEX SURFACES

FIELD OF THE INVENTION

The present invention relates to the forming of convex surfaces on diamond elements. In particular, although not exclusively, the invention relates to polishing spherical and super-hemispherical surfaces on diamond elements for use as metrology tips.

BACKGROUND TO THE INVENTION

A particular application of spherical surfaces is in coordinate measuring machines (CMMs) or metrology tips, where a spherical tip is mounted on a stem and used to measure or profile a workpiece. In metrology, spherical tips are used to map out the shape and roughness of surfaces made from metals, glasses, ceramics, crystalline, and other materials, whose surface shape needs to be measured with high accuracy. The tip is usually mounted on a partially flexible arm, which is fitted with a highly sensitive detector for sensing any flexing of the arm. Typically, movements of the order of a few nanometres can be detected. At the start of a measurement the tip is brought in contact with the object to be measured. Usually either the arm with the tip or the object to be measured itself is mounted on a XYZ translation stage and/or a rotary stage and the tip or the object is displaced or rotated according to a pre-programmed motion. Deviations of the shape of the object from the shape described by the pre-programmed motion are then detected by the flexing of the arm on which the tip is mounted.

In typical metrology applications, since the object to be measured is in general non-planar, different parts of the tip are in contact with the measurement object. In order to have a flexing of the measurement arm which is independent of the position on the tip, which is in contact with the object, the tip itself needs to be spherical to an accuracy which exceeds the accuracy of the motion so that the accuracy of the measurement is not adversely affected by the shape of the tip. Currently available tips suffer from the problem of wear, since the tip can be in continuous sliding contact with the surface of the object. Especially when hard and/or rough materials are measured, the wear of the tips leads to rapid deterioration of the spherical shape of the tip. This leads to measurement errors when using these tips. In such cases, the tip must be replaced by a new and undamaged tip. This leads to a high cost of measurement caused by the high cost of the tips and the need to recalibrate each new tip. Another common problem with softer materials such as aluminium is a build-up, even during a single measurement, of the material from which the measurement object is made on the surface of the tip, thus leading to measurement errors.

Furthermore in metrology one may want to measure the size of a hole in a material by passing balls of different diameters through the hole and determining the maximum size ball that does pass through the hole. In that case it is important that the balls are exactly spherical, do not deform and have low wear characteristics. For this application a completely spherical ball is not necessarily required, instead a super-hemispherical surface may suffice.

Computer operated machines which encompass such probes are increasingly replacing the use of traditional manually operated measuring instruments such as vernier callipers, micrometers and dedicated gauges. Such machines are used to assess the quality of material surfaces in many different fields. A field where quality control is of particular importance is in the automotive industry e.g. for the measuring of cylinder bore diameters on engine blocks. The tips can be used in a number of modes, including 'touch and step' (or 'touch mode'), and continual profiling (or 'scanning mode').

An example of such a machine is a coordinate measuring machine (CMM). CMM probes are transducers which convert physical measurements into electrical signals. The most common of these probes is the "touch trigger" probe. This works by actually contacting the surface of the object which is to be quality controlled. Upon contact with the surface, a signal with the coordinates of that point is sent to the CMM.

An alternative type of CMM probe is the scanning probe. This is passed across the surface of the target surface and transmits a continuous flow of data to the measurement system.

In both types of CMM probe, it is important that the probe itself has the correct properties. In order to give an accurate measurement which is, in fact, representative of the quality of the surface under observation, the probe should be spherical, resistant to wear and have a surface with a low roughness $R_a$ or $R_q$ (where $R_a$ is the average roughness and $R_q$ is the root mean square (RMS) roughness, both terms well known in the art).

Conventionally, CMM probes are typically made from high chrome, high carbon, stainless steel. In evaluating the failure of CMM tips, particularly the case of profiling tips, three typical failure methods have been identified:

1. As the tip slides over the surface fragments of aluminium stick to the tip material. In this phenomenon, detritus from the surface under observation accumulates on the tip of the probe leading to a degradation in performance. This is particularly the case where the surface under observation is formed from aluminium, as is common in the automotive industry;
2. The sliding contact wears a flat onto the tip (wear). Metrology tool tips and balls are currently made from hard materials such as tungsten carbide, ruby or sapphire but even these materials show wear over time;
3. On some surfaces the friction causes stick-slip motion of the tip, decreasing the accuracy of the measurement. To ensure accuracy, the probe must move over the surface under observation in a continuous manner rather than in a jolting motion.

Of these three failure methods, often the dominant one is not wear, but is accumulation of material from the surface being profiled, for example Al from an Al surface. As such, it is not obvious that particularly tough materials offer any real advantage over materials such as ruby, which is comparatively cheap, available in large solid pieces, and easy to fabricate to shape.

There is thus a great need for tool tips which are resistant to wear, resistant to the accumulation of detritus thereon and which can be caused to move over the surface under observation in a reliable continuous motion.

SUMMARY OF THE INVENTION

The present invention provides an element of diamond material having a convex surface formed thereon, the convex surface having a root mean square roughness, $R_q$, of less than about 30 nm, the element further having at least one of the properties from the following list:
(a) the convex surface including a spherical segment for which the maximum peak to valley deviation from a perfect spherical surface is less than about 5 µm;
(b) the convex surface including a spherical segment for which the RMS deviation of the spherical segment, as measured by averaging the square of deviations over the spherical segment, is less than or equal to about 500 nm;
wherein the diamond element is polycrystalline and/or comprises base material which is coated with diamond.

Preferably the diamond element comprises base material, preferably a sphere of base material, coated with diamond, preferably polycrystalline diamond.

The inventors have established that diamond shows exceedingly low wear characteristics and would be an ideal material from which to manufacture metrology tips and/or measurement balls. Further advantages to the use of diamond are provided by its hardness and very low friction coefficient when in contact with most hard and soft materials, including diamond itself. They consider that this would make diamond the preferred material for use in a metrology tip or measurement ball. Key to this invention is the realization that a diamond surface, particularly a diamond surface with low surface $R_a$ and $R_q$ (roughness) and which is free of defects such as pits, digs and scratches, accumulates less material from the surface being measured, and thus provides a longer life.

A particular advantage of diamond over conventionally used materials is that on aluminium, pick up is very much reduced i.e. the accumulation of material from the surface being tested is very much reduced. This is thought to be related to the low chemical reactivity of diamond.

Furthermore, they have now determined ways to resolve the existing problems of how to shape a diamond tip into a sphere or super-hemisphere to the required accuracy. Accordingly, it is an object of the present invention to address the problems associated with producing diamond material having spherical surfaces of high quality and low radius of curvature.

In particular, it is an object of the invention to produce hemispherical or super-hemispherical surfaces on a diamond element suitable for use as a tool tip in a metrology system. It is a further object of this invention to provide a method that addresses the problems in polishing diamond material to a required thickness to within high accuracy.

In accordance with this first aspect of the invention an element of diamond material having a convex surface formed thereon, may have on its convex surface at least one, preferably two, more preferably three, more preferably still four, and even more preferably five of the following properties outlined below:

(i) The convex surface includes a spherical segment in which the maximum peak to valley deviation from a perfect spherical segment is equal to or less than about 5 μm, more preferably equal to or less than about 3 μm, yet more preferably equal to or less than about 2 μm, more preferably equal to or less than about 1.5 μm, more preferably equal to or less than about 1 μm, more preferably equal to or less than about 500 nm, still more preferably equal to or less than about 300 nm, more preferably equal to or less than about 200 nm, yet more preferably equal to or less than about 100 nm and most preferably equal to or less than about 50 nm.

(ii) The convex surface includes a spherical segment, wherein the root mean square (RMS) deviation of the spherical segment, as measured by averaging over the square of deviations over the spherical segment from an ideal sphere, is equal to or less than about 500 nm, more preferably equal to or less than about 250 nm, more preferably still equal to or less than about 100 nm, yet more preferably equal to or less than about 60 nm, even more preferably equal to or less than about 40 nm, more preferably equal to or less than about 20 nm and most preferably equal to or less than about 10 nm.

(iii) The convex surface has a root mean square surface roughness ($R_q$, as defined in 'Tribology', I M Hutchings, published by Edward Arnold, 1992, pages 8-9) of less than about 30 nm, preferably about 10 nm, more preferably about 5 nm, yet more preferably about 3 nm, and more preferably about 1.5 nm.

(iv) The radius of curvature of the convex surface is less than about 20 mm, preferably less than about 10 mm, more preferably less than about 5 mm, yet more preferably less than about 2 mm, yet more preferably less than about 1 mm and yet more preferably less than about 0.5 mm. The minimum radius of curvature is greater than about 0.02 mm, preferably greater than about 0.05 mm, preferably greater than about 0.1 mm, preferably greater than about 0.2 min preferably greater than about 0.5 mm. A preferred radius of curvature is between about 0.15 mm and about 4.0 mm, particularly between about 0.5 mm and about 1.5 mm.

(v) The convex surface includes a spherical segment with a conical half-angle greater than about 10°, preferably greater than about 20°, more preferably greater than about 40°, yet more preferably greater than about 60°, more preferably greater than about 80°, more preferably still greater than about 90°, yet more preferably greater than about 110°, more preferably greater than about 130° and most preferably greater than about 150°.

The root mean square surface roughness, $R_q$, is related to the average surface roughness, $R_a$, such that for a Gaussian distribution of deviations from the mean, $R_q$ is equal to 1.25 $R_a$.

The surface roughness $R_q$ or $R_a$ values can be obtained using an atomic force microscope ("AFM"). The technique of using an AFM to determine surface roughness is well known in the art. As the radius of curvature of the diamond elements of the present invention is very much greater than their surface roughness, $R_q$ or $R_a$, it is straightforward to automatically deconvolute the surface roughness from the curvature and thereby provide a realistic numerical value for the surface roughness. Alternatively, the surface roughness, $R_q$ or $R_a$, may be determined by use of a surface profilometer.

The preferred geometry is a spherical segment, preferably a hemisphere, more preferably a superhemisphere, or even better a complete sphere.

The sphericity of the spherical surface should be at least better than about 254 nm, preferably better than about 127 nm and more preferably better than about 54 nm.

The term "sphericity" as used herein defines the maximum deviation of the surface from that of a perfect sphere. More specifically, the sphericity provides a measure of the maximum distance of a point on the spherical surface being measured from the position that the point in question would be in if the surface was the surface of a perfect sphere.

It will be appreciated that a spherical segment with a conical half angle greater than 90° may form the basis for a super-hemispherical segment.

A further convex surface may be provided on an opposite side of the element to the convex surface described above. The further convex surface may have the same radius of curvature as the first convex surface, and may be used in a special case to form a complete sphere, or alternatively may have a larger radius of curvature. Other combinations are also possible, including combining a convex spherical surface with a convex aspheric surface, and combining convex surfaces with concave surfaces.

The diamond element of the present invention may be a diamond solid immersion lens (SIL). As described in Optical Near-Field Recording by J. Tominaga and T. Nakano, Springer-Verlag, Berlin Heidelberg, 2005, ISBN 3-540-22128-X, a SIL should have a shape which is hemispherical or super-hemispherical with a polished flat surface opposite the spherical surface. Its thickness, t, is determined to be either equal to the radius of curvature, r, of the SIL in the case of the hemispherical SIL $$t=r \quad (1)$$

or for a super-hemispherical SIL $$t=r(1+1/n) \quad (2)$$

where n is the index of refraction of the material from which the SIL is made at the wavelength of radiation used.

Thus, alternatively, a flat surface may be provided on an opposite side of the element to the convex surface. The flat surface preferably has a roughness at least as low as the convex surface. The thickness of such an element (in the direction normal to the flat surface) is preferably determined to an accuracy of at least 0.2 μm and more preferably 0.1 μm compared to the ideal thickness in applications of solid immersion lenses where equation (2) applies. In other applications, the thickness limits may be slightly relaxed, although the thickness should still preferably be determined to an accuracy of at least about 2 μm, more preferably about 1 μm, and more preferably about 0.5 μm. Some other applications may also require the greater accuracy of about 0.2 μm or about 0.1 μm even where equation (2) does not apply.

Diamond spheres and super-hemispheres according to the invention can be formed in two ways, either from solid freestanding polycrystalline diamond, or by coating a different base material already in the form of a sphere or appropriate spherical segment.

The diamond material used for coating may be single crystal diamond material or polycrystalline diamond material and is preferably polycrystalline diamond material.

Suitable base materials will be known to those of skill in the art, but may preferably be formed from one of SiC, SiNx (particularly $Si_3N_4$), more preferably SiC or $Si_3N_4$, and more preferably still, SiC. A particularly preferred silicon carbide is reaction bonded silicon carbide which comprises silicon carbide and silicon, an example of which is "REFELR®" manufactured by Morgan Advanced Materials, Stourport-on-Severn, UK.

In one example of a practical methodology for generating a diamond sphere according to the invention, a substrate sphere of smaller diameter than the final product can be used. The sphericity of the substrate sphere is not essential for the final product, provided that the coating thickness is sufficient to accommodate any spherical processing required, and preferably that the coating thickness in the final product does not vary about the mean by more than about +/−30%, more preferably by more than about +/−25%, by more than about +/−15%, or by more than about +/−10%. The surface of the substrate sphere should be sufficiently rough to allow adhesion of the diamond coating. This sphere may then be coated with a layer of polycrystalline diamond.

For example, one prototypic method for the deposition of diamond onto a base sphere or spherical segment is described in Biener et al., 2005 (Target Fab Conference proceedings paper submitted to "Fusion Science & Technology", Jun. 22, 2005. Diamond Ablators for Inertial. Confinement Fusion). In brief, their specific method was performed in a 6 kW microwave reactor equipped with a custom made substrate holder specifically designed to guarantee uniform coating of spherical substrates. The substrate temperature was between 700-900° C., and a mixture of one percent methane in hydrogen was used as process gas. Under these conditions a deposition rate of ~2 μm/h was obtained. Nanocrystalline diamond films were grown on silicon (100) substrates using a hot-filament CVD reactor (CerneCon CC800/Dia). In order to achieve a high nucleation density, the substrates were treated by bias enhanced nucleation before film growth. A feed gas mixture of ~3% methane in hydrogen was used. Additionally, oxygen was inserted periodically to the gas mixture with an average concentration of ~1% to facilitate the development of a nanocrystalline grain structure.

After coating, the sphere (or sphere segment) may be mounted on an axis, and polished in one of the ways described herein. This will give the sphere its required surface accuracy and roughness.

According to the invention, the diamond element may alternatively be made of solid polycrystalline diamond. Methods for generating solid polycrystalline diamond are known in the art, and are described in detail, for example, in numerous articles in the literature.

CMM tips are generally used in a range of sizes, typically from 1-8 mm, since the diameter of the sphere must be greater than the stem onto which it is attached, and different stem lengths need to have different diameters to provide the appropriate stiffness, Small sizes of CMM tip can be made from single crystal (SC) diamond. However, for larger sizes this becomes increasingly difficult or expensive due to the size of diamond piece required. The present invention provides for diamond surfaces which conform both to conditions of sphericity and surface smoothness, and in particular provides for such surfaces in the application of metrology tips.

In instances where diamond coated material is used, the thickness of the coating will vary depending on which application the element is destined for. Examples of preferred suitable ranges of diamond coating include between about 1 nm and about 10 nm, about 10 nm and about 100 nm, about 100 nm and about 1 μm, about 1 μm and about 10 μm, about 10 μm and about 100 μm, about 100 μm and about 1 mm, with between about 1 μm and about 10 μm and between about 10 μm and about 100 μm being preferred thickness ranges.

Preferably the diamond element of the present invention is a metrology tip.

In accordance with a further aspect of the present invention there is provided a metrology apparatus, comprising:
  an arm which is at least partially flexible;
  a movement sensor operatively associated with the partially flexible arm; and
  a tool tip located at one end of the partially flexible arm, the tool tip comprising a diamond element as described above. According to this aspect of the invention, the diamond element may be made of solid polycrystalline diamond. Alternatively, the element may be a diamond-coated material. The diamond material used for coating may be single crystal diamond material or polycrystalline diamond material and is preferably polycrystalline diamond material.

Further applications of diamond elements according to the invention include reference spheres for use in measuring the diameters of holes, calibrating measurement apparatuses such as callipers, and for use as references that define a plane. In general it is possible to define a flat reference surface by 3 points: in practice, the surface is laid on top of 3 balls, but these need not be full spheres. Diamond elements in accordance with the present invention are well suited to this application as they are hard, exhibit low wear, and can be manufactured to very precise size tolerances.

A further application for substantially spherical polycrystalline diamond elements is as bearings. The exceptionally low wear of diamond makes it a particularly appropriate material for such use.

The polycrystalline diamond may contain boron at a concentration greater than about $10^{16}$ atoms $cm^{-3}$, preferably greater than about $10^{17}$ atoms $cm^{-3}$, preferably greater than about $10^{18}$ atoms $cm^{-3}$. The polycrystalline diamond may contain boron at a concentration less than about $10^{21}$ atoms $cm^{-3}$, preferably less than about $10^{20}$ atoms $cm^{-3}$. Where the polycrystalline diamond contains boron, the boron is preferably substantially uniformly distributed through the diamond material. Such uniformity is macroscopic uniformity rather than on the scale of individual grains.

For use in the applications of the present invention, as a measuring tip or stylus in a metrology apparatus the optical properties of the diamond are not important, and indeed it may even be desirable for the diamond to be opaque so that it is easier to see. It is more important to ensure that the diamond has reliable wear characteristics. Suitable materials will be apparent to those of skill in the art, imbued with the teaching of the present application and include synthetic diamond, such as synthetic type IIb diamond. A preferred material is CVD polycrystalline diamond. For coated diamond elements according to the above aspects of the invention, the diamond may be polycrystalline or single crystal, and again, a preferred material is CVD diamond.

Type IIb diamond contains boron, and this is known to reduce the wear rate. This is a particularly useful property if the boron is uniformly distributed through the material. If the boron is non-uniformly distributed an uneven wear rate will result. It will also make it more difficult to achieve the convex surface with the necessary degree of control. To achieve uniform boron distribution it is preferred, in coating applications, that the element is formed from CVD boron-doped diamond, such as is provided by WO 03/052174.

There may be advantages with using boron-doped polycrystalline CVD diamond such as reduced wear combined with even lower build up of workpiece material on the surface. This also applies to coatings of boron-doped polycrystalline diamond on a suitable substrate.

In a further embodiment, a boron-doped diamond coating may be applied to a non-boron-doped single crystal diamond to give even further improved resistance to workpiece material build-up.

For elements that have been coated with diamond material, either polycrystalline or single crystal diamond may be used for the coating process. Preferably, CVD diamond is used for coating. Methods for coating elements with diamond are known in the art and include hot-filament assisted chemical vapour deposition (HF-CVD), microwave plasma-assisted chemical vapour deposition (MW-CVD) and other CVD methods known in the art. In order to deposit diamond material onto a spherical surface, preferred methods include HF-CVD and MW-CVD, with MW-CVD being the preferred technique. After this process is complete, the coated diamond will need to be polished to refine its surface for its intended application.

It is well known that diamond is the hardest material available in nature. Diamond is therefore traditionally polished using rapidly rotating cast-iron or bronze wheels or "scaifes" impregnated with a fine diamond powder. Scaife technology enables the production of finely polished diamond surfaces. Unlike glass, which is an isotropic amorphous material (having the short range order of a liquid but no long range order), diamond is a cubic crystal. This means that in certain planes relative to the crystal axes it is relatively easy to polish diamond, while in other directions polishing is almost impossible by traditional methods. In particular, the "soft" (easily polished) planes coincide with (for example) the so-called 2-point and 4-point planes, known in crystallographic terminology as {110} and {100} planes, while the so-called 3-point planes (the {111} planes) coincide with the "hard" or very difficult to polish planes.

More recent methods involve the use of polishing wheels comprising resin polymer filled with diamond powder and mounted on metal carrier wheels or cups, and this enables polishing of diamond in arbitrary directions. However, the effects of varying hardness in different directions are still clearly present, and the polishing speed therefore still varies with the orientation of the crystal. For most traditional diamond polishing only flat planes are polished, in which case the speed of polishing is uniform over the area of the plane, resulting in uniform removal of material.

When polishing a spherical surface onto a single crystal diamond, a polycrystalline diamond or a polycrystalline CVD diamond coating on a spherical substrate, as required by a metrology or CMM tip, the polishing wheel or cup must remove material from the lens over a range of orientations of the polishing wheel with respect to the crystal axes. Thus, even when using a resin-bond polishing wheel or cup, the removal rate will be non-uniform across the surface. This results in a surface having large deviations from the intended ideal spherical shape, especially if a substantial fraction of a hemisphere is required.

Diamond spheres have been produced previously from poly-crystalline material, although their use in metrology applications has hitherto not been suggested. Where polycrystalline material fabricated by Chemical Vapour Deposition (CVD) is used, it is possible to grow the diamond onto a pre-shaped surface. The as-grown diamond discs are then polished flat using standard techniques of resin-bond wheel polishing, or can be given a curved finish with a curved polishing wheel or cup.

One difficulty with polycrystalline CVD diamond is that the orientation each diamond grain presents to the processed surface is different, so that even across a flat surface the processing behaviour of the material varies from point to point. In addition, the grain boundaries can be points of weakness or formation of cracks or open features on the processed surface.

With single crystal diamond, because the polishing rate varies with crystallographic orientation, achieving specific tolerances on sphericity has until now proven very difficult. Furthermore, the final application may require both smoothness (e.g. low $R_a$ and $R_q$) and sphericity, and this combined requirement is more difficult than achieving either independently.

In accordance with another aspect of the present invention there is provided a method of forming a rotationally symmetrical surface on a polycrystalline diamond element, the method comprising:

rotating a blank formed from diamond material about a first axis;

applying a laser beam to the blank, the laser beam supplying sufficient light intensity to cut the blank; and translating the laser beam relative to the blank along a two-dimensional path;

whereby the simultaneous rotation of the blank and translation of the laser beam relative to the blank results in a rotationally symmetrical surface being cut in the blank.

It will be appreciated that translation of the laser beam relative to the blank may be achieved by translating the blank and keeping the laser stationary.

The rotationally symmetrical surface is preferably a spherical surface, in which case the translation of the laser beam relative to the blank may follow a path substantially described by an arc of a circle having a central axis passing through the centre of curvature of the spherical surface, so that the simultaneous rotation of the blank and translation of the laser beam relative to the blank results in the substantially spherical surface being cut in the blank. The path followed by the laser beam relative to the blank may deviate a predetermined amount from the precise arc of the circle when the laser beam is close to the axis of rotation of the blank.

It will be appreciated that the method described above may also be adapted to form other shapes apart from spherical. The method allows the production of rotationally symmetrical diamond elements usable in a range of applications, for example diamond anvils for use in high pressure cells. Such a rotationally symmetric shape may be the final shape of the object or an intermediate shape which is then further processed. In preferred embodiments (and in particular for the production of a spherical surface) the laser beam should be applied to the blank in a direction substantially perpendicular to the first axis, and the laser should be translated relative to the blank in a plane perpendicular to the laser beam.

In a preferred embodiment, the blank is formed by cutting a disc from a diamond plate using a laser. The disc should have a thickness slightly greater than the thickness of the element to be formed. As used herein, the word "disc" is intended to include cylinders whose height is less than, equal to or greater than their diameter. It will also be appreciated that the curved edge of the disc may not be exactly perpendicular to the flat surfaces either side: the curved edge may form a section of a cone as a result of the constraints of laser cutting. The blank is preferably mounted on a carrier rotatable about the first axis. This carrier may be a cylindrical metal rod, and the blank is preferably brazed onto the rod to enable simple removal. Alternatively, the blank may be left on the rod, and this may even form the finished product. This may be useful in the construction of a metrology apparatus.

The method described above results in a polycrystalline diamond element having a spherical surface which may be sub-hemispherical, hemispherical or super-hemispherical. The method produces spherical surfaces with low deviations from a perfect spherical surface and surface roughness. However, for certain applications it may be necessary to polish the element further to improve the sphericity and surface finish.

Thus in accordance with another aspect of the present invention there is provided a method of polishing a spherical surface on a polycrystalline diamond element, comprising:
  rotating the element about a first axis at a first rate of rotation;
  pressing a cup having a polishing surface against the spherical surface, the polishing cup rotating about a second axis at a second rate of rotation much higher than the first rate.

In one embodiment the cup additionally rotates about a third axis at a third rate lower than the first rate, the third axis being perpendicular to the first axis and passing through the first axis at the centre of curvature of the spherical surface, the rotation about the third axis being an oscillatory motion describing less than 360° and preferably less than 180°. The rate of rotation about the third axis may vary, preferably randomly, to improve the averaging over the whole surface.

The polishing surface of the cup is preferably a hard material to ensure slow and controllable polishing of the spherical surface. In one embodiment the polishing surface may comprise a layer of diamond powder embedded in a former such as resin or phosphor-bronze. However, it is preferred that the polishing surface comprises a layer of sintered diamond particles.

One suitable polishing surface comprises a layer of polycrystalline diamond grains sintered together at high temperature and high pressure in the presence of a cobalt-rich second phase. This promotes the sintering together of the diamond grains to form a cohesive polycrystalline mass in which the spaces between the grains are filled by the cobalt-rich second phase. One example of such material is PCD Syndite®.

Another suitable polishing surface comprises a layer of polycrystalline diamond sintered together at high temperature and high pressure in the presence of a second phase. The second phase is ceramic and fills all space between the diamond grains so that the material is fully dense. One example of such material is PCD Syndax®.

A further alternative for the polishing surface is provided by a diamond-silicon carbide composite material made by a reaction bonding process. The material comprises diamond particles in a predominantly silicon carbide matrix and one example of such material is Skeleton® cemented diamond.

In a further alternative, the polishing surface may comprise a layer of polycrystalline CVD diamond.

The polishing surface may be concave, such that it substantially matches the shape of the spherical surface to be polished. Alternatively, the polishing surface may initially be substantially flat, the polishing surface being worn into the necessary concave shape by the action of polishing the spherical surface of the element.

A flat surface may be polished on the opposite side of the element to the spherical surface. This may be performed by pressing the diamond element against a polishing wheel. The diamond element may be mounted in a holder comprising a spherical cup as it is pressed against the polishing wheel. The thickness of the element is preferably controllable to within 10 µm, more preferably 5 µm, more preferably 2 µm, more preferably 1 µm, more preferably still 0.5 µm, more preferably 0.2 µm, and most preferably 0.1 µm.

The method may also include forming an element which has a mounting hole or cone formed in the opposite side to the convex surface. Where the element is used as a metrology tool tip, for example, this may facilitate the mounting of the tip onto its partially flexible arm.

The invention also provides apparatus for carrying out the methods described above. Thus according to a further aspect of the invention there is provided an apparatus for forming a spherical surface on a polycrystalline diamond element, the apparatus comprising:
  a spindle rotatable about a first axis and adapted to receive a polycrystalline diamond blank;
  a source of laser light for directing a laser beam towards the diamond blank when mounted on the spindle, the laser beam being directed in a direction substantially perpendicular to the first axis; and
  translation means for translating the laser light source relative to the spindle along a two-dimensional path in a plane perpendicular to the laser beam.

In a further aspect there is provided apparatus for polishing a spherical surface formed on a solid polycrystalline or coated single crystal or polycrystalline diamond element, the apparatus comprising:
  a rotary stage adapted to receive the element and being rotatable about a first axis;
  a polishing cup mounted on a high speed rotary spindle; and
  means for pressing the polishing cup onto the element.

The high speed rotary spindle is preferably mounted on a rotary arm, the rotary arm rotatable about an axis perpendicular to the first axis and passing therethrough at the centre of curvature of the spherical surface.

In one embodiment, the present invention provides an element of diamond material having a convex surface formed thereon, the convex surface having a root mean square roughness, $R_q$, of less than about 30 nm, preferably less than about 10 nm, more preferably less than about 5 nm, yet more preferably less than about 3 nm, and more preferably less than about 1.5 nm, the element further having at least one, preferably both, of the properties from the following list:
  (a) the convex surface including a spherical segment for which the maximum peak to valley deviation from a perfect spherical surface is less than about 5 µm, more preferably equal to or less than about 3 µm, yet more preferably equal to or less than about 2 µm, more preferably equal to or less than about 1.5 µm, more preferably equal to or less than about 1 µm, more preferably equal to or less than about 500 nm, still more preferably equal to or less than about 300 nm, more preferably equal to or less than about 200 nm, yet more preferably equal to or less than about 100 nm and most preferably equal to or less than about 50 nm;
  (b) the convex surface including a spherical segment for which the RMS deviation of the spherical segment, as measured by averaging the square of deviations over the spherical segment, is less than or equal to about 500 nm, more preferably equal to or less than about 250 nm, more preferably still equal to or less than about 100 nm, yet more preferably equal to or less than about 60 nm, even more preferably equal to or less than about 40 nm, more preferably equal to or less than about 20 nm and most preferably equal to or less than about 1.0 nm;
wherein the diamond element is polycrystalline.

In an alternative embodiment, the present invention provides an element of diamond material having a convex surface formed thereon, the convex surface having a root mean square roughness, $R_q$, of less than about 30 nm, preferably less than about 10 nm, more preferably less than about 5 nm, yet more preferably less than about 3 nm, and more preferably less than about 1.5 nm, the element further having at least one, preferably both of the properties from the following list:
  the convex surface including a spherical segment for which the maximum peak to valley deviation from a perfect spherical surface is less than about 5 µm, more preferably equal to or less than about 3 µm, yet more preferably equal to or less than about 2 µm, more preferably equal to or less than about 1.5 µm, more preferably equal to or less than about 1 µm, more preferably equal to or less than about 500 nm, still more preferably equal to or less than about 300 nm, more preferably equal to or less than about 200 nm, yet more preferably equal to or less than about 100 nm and most preferably equal to or less than about 50 nm;
  (b) the convex surface including a spherical segment for which the RMS deviation of the spherical segment, as measured by averaging the square of deviations over the spherical segment, is less than or equal to about 500 nm, more preferably equal to or less than about 250 nm, more preferably still equal to or less than about 100 nm, yet more preferably equal to or less than about 60 nm, even more preferably equal to or less than about 40 nm, more preferably equal to or less than about 20 nm and most preferably equal to or less than about 10 nm; and
a radius of curvature of the convex surface is less than about 20 mm, preferably less than about 10 mm, more preferably less than about 5 mm, yet more preferably less than about 2 mm, yet more preferably less than about 1 mm and yet more preferably less than about 0.5 mm, wherein the diamond element comprises base material, preferably a sphere of base material, which is coated with diamond, preferably polycrystalline diamond.

As used herein, the term "about" in relation to a numerical value x means, for example, x±1.0%. In particular, the term "about x" is intended to include all of the values between x−10% and x+10%, including the value x itself.

BRIEF DESCRIPTION OF THE DRAWINGS

Some preferred embodiments of the invention will now be described by way of example only and with reference to the accompanying drawings, in which.

DESCRIPTION OF THE INVENTION

Figure 1:
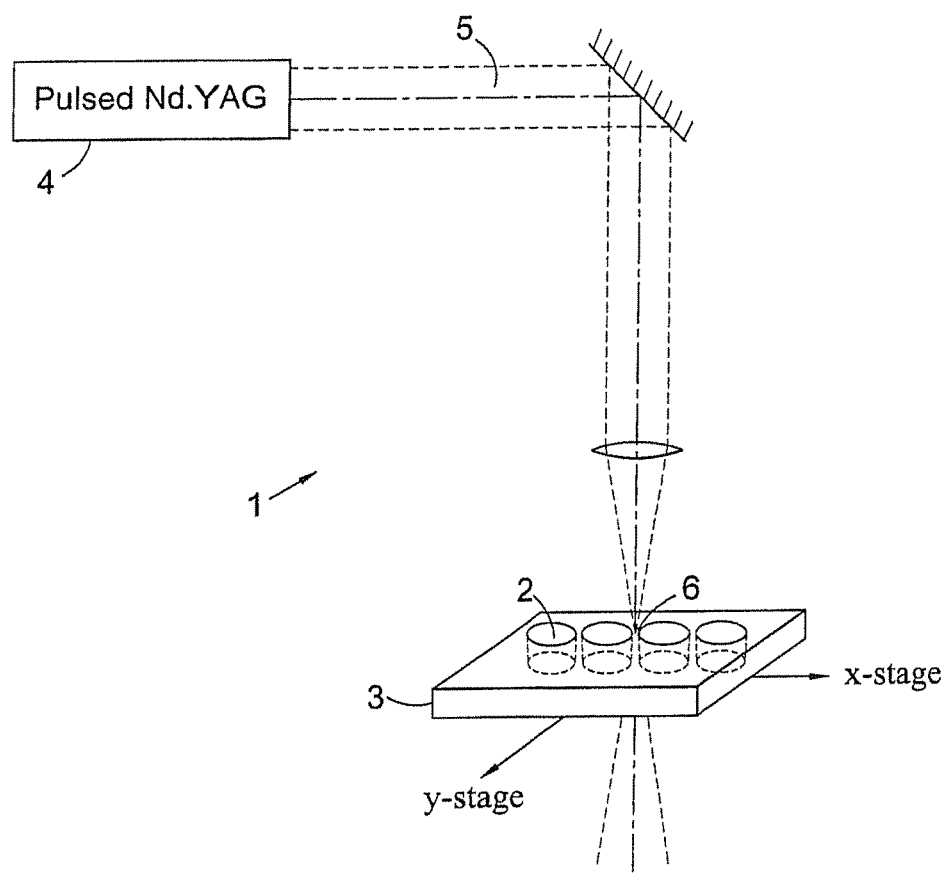
FIG. 1 is a schematic view of an apparatus for cutting cylindrical sections out of a diamond plate.

FIG. 1 is a schematic view of an apparatus 1 for cutting cylindrical sections 2 from a diamond plate 3 for use as blanks onto which spherical surfaces can be formed. The apparatus comprises an X-Y translation stage (not shown) onto which the diamond plate 3 is mounted. A cutting laser 4, for example a pulsed. Nd:YAG laser, generates a light beam 5 which is focussed onto the diamond plate 3 and which has sufficient energy to cut the diamond of the plate.

The translation stage carrying the diamond plate 3 executes a substantially circular motion with respect to the position of the focus 6 of the laser beam, and as a result a cylinder is cut out of the diamond plate. The width of the plate is chosen to be larger than the size of the diamond element which will eventually be formed.

In practice, the laser light is focussed to a spot 6, initially on the surface of the plate 3. This means that the cut into the plate 3 must generally have a "V" shaped cross-section in order to ensure that the focus can be maintained lower down the cut. As a result, cylinders 2 cut from the plate are often not perfect cylindrical sections, but usually have curved surfaces which are narrowly inclined—i.e. the shape cut from the plate 3 is effectively a slice of a cone. It will be understood that the words "cylinder" and "disc" as used herein are intended to encompass such shapes, and that they also should encompass any relationship between diameter and length (of cylinder) or width (of disc).

Figure 2A:
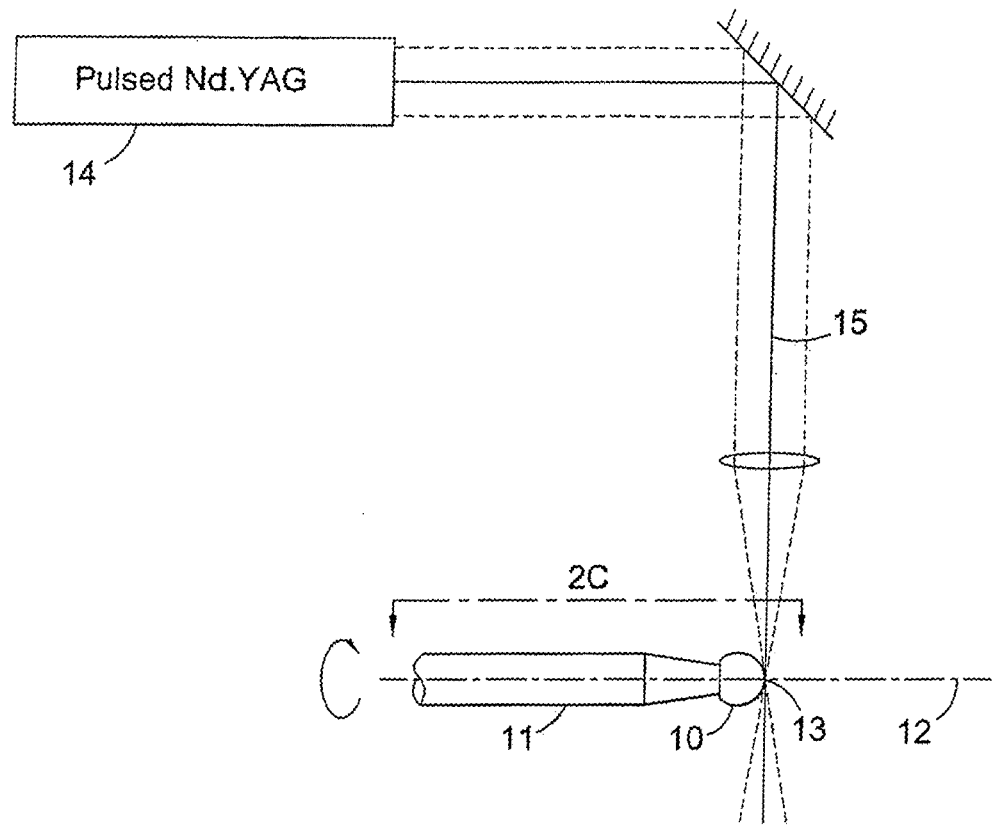
FIGS. 2A-2C shows a schematic view of a system for cutting a substantially spherical shape onto a diamond element.
Figure 2B:
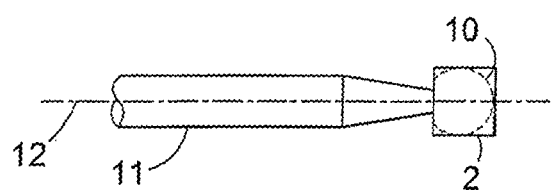
Figure 2C:
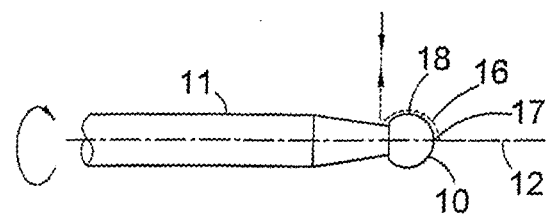

FIGS. 2A to 2C show a schematic view of an apparatus for cutting a spherical surface 10 into the diamond cylinder 2. As shown in FIG. 2B, the diamond cylinder 2 is brazed with one of its flat sides onto a cylindrical rod 11 made, for example, from molybdenum or tungsten carbide. Tungsten carbide is preferred because of its hardness and stiffness (that is, Young's modulus). The brazing material should be an alloy of copper, silver and titanium or an alloy of gold and tantalum, although it will be appreciated that other materials may be used. Before brazing, the diamond cylinder 2 is positioned with its symmetry axis 12 as accurately as possible coincident with the symmetry axis of the rod 11.

The rod 11 is mounted in a high speed rotating spindle (not shown). The diamond cylinder 2 mounted on the rod 11 is positioned close to the focus 13 of a high power laser 14 so that the axis of rotation 12 of the spindle is perpendicular to the direction of the incoming laser light 15. The spindle is mounted on a translation stage (not shown) so that the diamond cylinder 2 can be translated in two dimensions in a plane perpendicular to the direction of the incoming light, as shown in FIG. 2C. (In FIG. 2C the laser beam is normal to the plane of the paper.) By translating the cylinder relative to the laser 14 as it is rotated, a shape can be cut out of the diamond that has rotational symmetry with respect to the rotation axis 12 of the spindle. If the translation follows the arc of a circle 16, the surface 10 cut into the cylinder 2 is spherical. It will be appreciated that this apparatus may be used to cut other rotationally symmetrical shapes from the diamond cylinder 2 and is not limited to spherical surfaces. For example, the apparatus could be used to prepare polycrystalline diamond anvils for use in high pressure cells. Alternatively, aspheric surfaces, such as a paraboloid or ellipsoid shapes, may be formed.

It will be appreciated that, at the point 17 on the cylinder furthest from the spindle (i.e. on the axis of rotation, at the "pole") the linear speed of the element surface will be slow compared to a point 18 far from the axis of rotation (i.e. on the "equator"). The laser therefore cuts faster at the pole 17, as it is cutting substantially at the same point all the time. There is therefore a danger that, if the laser light 15 exactly follows the arc of a circle relative to the cylinder 2, the pole 17 of the spherical surface 10 will be slightly flattened as a result of the additional cutting. This problem can be overcome by ensuring that the path 16 of the laser deviates slightly from a perfect arc, so that at the pole 17 it moves slightly further away from the spindle than a perfect arc would suggest.

If a spherical surface is formed, deviations from the ideal spherical surface are typically less than 20 µm, and may be less than 15 µm, 10 µm and even 5 µm. The surface itself at this stage typically has a RMS roughness $R_q$ of order 1 µm, although a RMS roughness $R_q$ of 200-300 nm is preferred, preferably better than $R_q<100$ nm, preferably better than $R_q<10$ nm or even better $R_q<1$ nm. For some applications this may be sufficient, in which case no further processing will be necessary. However other applications require higher specifications for the sphericity and roughness of the element. In such cases further polishing will be necessary.

In the case where there are pits in the surface, these should not be deeper than 5 µm in the surface, preferably less than 1 µm or more preferably less than 100 nm. Diamond elements in which there are no pits, digs or scratches are preferred.

Figure 3:
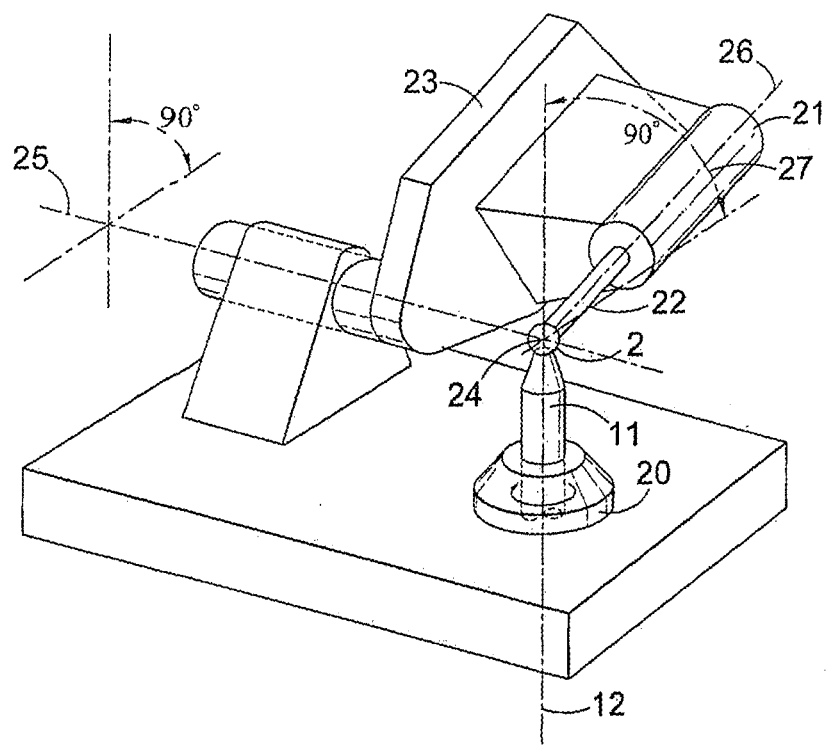
FIG. 3 shows a schematic view of a polishing setup for improving the spherical surface of the element by polishing.

FIG. 3 is a schematic view of an apparatus for polishing the spherical surface on a diamond element 2 to improve the characteristics. The element 2, still brazed to the rod 11, is mounted in a rotational stage 20, which rotates at a low rate of typically 0.1-100 rpm around the axis 12 of the rod 11.

A high-speed rotary spindle 21 fitted with a polishing cup 22 is pressed against the rotating diamond element 2. The force with which this cup 22 is pressed against the sphere may be adjusted by a spring (not shown) and depends on the size of the element 2 to be polished. Typically a force between 0.20 and 6 N is used. The rotary spindle rotates at a rate of the order of 5,000-60,000 rpm. The rate to be used depends on the radius of curvature of the spherical surface 10.

The polishing cup 22 has a polishing surface formed of a suitable hard material for polishing diamond. In one embodiment the polishing surface includes diamond particles embedded in a former such as phosphor-bronze or resin. Phosphor-bronze cups can be made on a Computer Numerically Controlled (CNC) turning lathe. Resin-bond cups can be produced by casting a diamond-filled resin in a mould with an appropriate radius of curvature equal to the desired radius of curvature of the spherical surface of the diamond element. Alternatively, particularly for very small radii (typically a desired radius less than about 2 mm) the cup 22 may be made out of a small cylinder of resin-bond material with a central hole so that the desired shape is produced in the cup during the polishing process itself. At the end of the polishing step, when the diamond spherical surface is finished, the resin cup has a concave spherical shape matching the convex spherical surface of the diamond element.

The high-speed rotary spindle 21 itself is itself mounted on a rotary arm 23, which rotates slowly around an axis 25 that is perpendicular to the axis 12 of the rotary stage and passes through it at the centre of curvature 24 of the spherical surface 10. The axis of rotation 25 of the rotary arm is also perpendicular to the axis 26 of the high-speed rotary spindle. Rotary motion around this axis 25 is not over a full circle: instead an arc 27 is described in a bi-directional oscillatory motion, the angle of the arc 27 depending on the extent of the spherical surface on the diamond element. For a super-hemispherical surface 10 the arc may subtend an angle of approximately 90°. The period of this oscillatory motion is greater than the period of the rotary stage 20, typically between 3-10 times the period of the rotary stage 20. In a preferred embodiment the period of the rotary arm 23 is not constant, so as to improve the averaging over the whole spherical surface 10. The period may change randomly.

It will be appreciated that if the cup 22 is sufficiently large compared to the size of the spherical surface, the cup can be kept at a fixed position relative to the element 2 and rotated only about its own axis 26. In this arrangement, the cup 22 is fixed such that it contacts the element 2 over an area which includes the apex of the diamond spherical surface 10 and which extends to the edge of the spherical surface.

In this step the different hardnesses of different polishing directions still causes deviations of the diamond spherical surface from an ideal spherical surface. This deviation depends on the area of the spherical surface 10 relative to a full sphere with the same radius of curvature, and also on the directions of the hard (difficult to polish) and soft (easy to polish) crystal directions of the diamond with respect to the surface. A hemispherical or super-hemispherical surface with its apex in the <100> crystal direction is polished over all crystal directions. The deviations of such a surface, with a radius of curvature of between 0.5 mm and 2.5 mm, from an ideal super-hemisphere can be made to be equal to or less than 5 µm, and deviations less than 3 µm, 2 µm and even 1.5 µm can be achieved. Such deviations may be measured optically using an interferometer, or mechanically using a metrology apparatus. RMS surface roughness $R_q$ can be reduced to below 30 nm, and RMS roughness $R_q$ below 10 nm, 5 nm, 3 nm and even 1.5 nm can be achieved.

A further improved surface accuracy can be obtained by replacing the resin-bond polishing cup 22 by a cup made out of single crystal diamond, or sintered polycrystalline diamond such as PCD Syndite®, PCD Syndax® as produced by Element Six Ltd of Shannon, Ireland, Skeleton® cemented diamond as was produced by Stockholm Termobehandling AB of Stockholm, Sweden, or polycrystalline diamond grown by chemical vapour deposition. A cup 22 may be produced by cutting a disc from a plate of one of the materials listed. The disc is then mounted on a carrier which is then mounted on the high-speed rotary spindle 21. The disc can be mounted on the carrier by brazing, soldering or gluing.

A central hole is then drilled in the disc, for example by using a laser. The cup 22 may be pre-shaped with a concave spherical surface by polishing with a diamond sphere of approximately the same diameter on a high-speed lathe. Thus a polished surface on the cup, approximately fitting the radius of the diamond spherical surface to be polished, is formed. Alternatively, the disc may be left flat, so that a polished cup shape is formed by the action of polishing the spherical surface on the single-crystal diamond element, with a radius of curvature matching that of spherical surface 10.

Using synthetic material for the diamond element and hard polishing materials as described above, it has been found possible to produce a sub-hemispherical, hemispherical or super-hemispherical surface with deviations from the ideal spherical shape that are less than or equal to 1.5 µm, and surfaces with peak-valley deviations less than 1 µm, 500 nm, 300 nm, 200 nm, 100 nm and even 50 nm have been achieved. Using this technique, it is possible to produce spherical surfaces where the root mean square (RMS) deviation of the shape, as measured by averaging over the square of the deviations over the polished surface from the ideal sphere, is less than or equal to 500 nm, and RMS deviations less than 250 nm, 100 nm, 60 nm, 40 nm, 20 nm and even 10 nm have been achieved.

Figure 4:
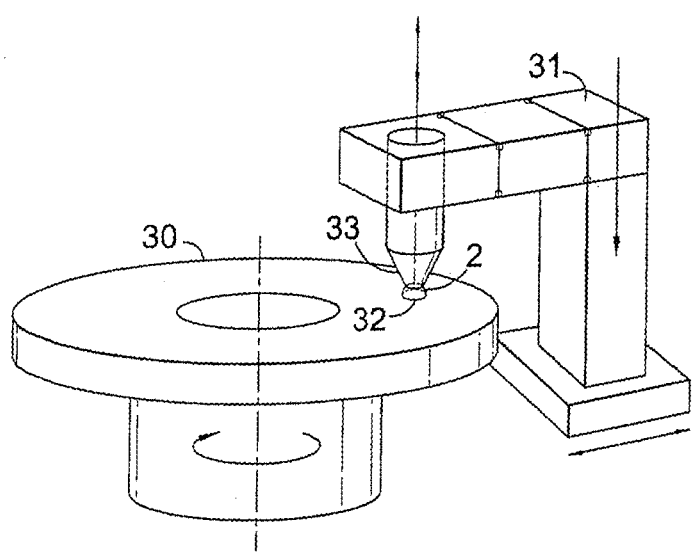
FIG. 4 shows a schematic view of a high speed polishing scaife for polishing a flat surface onto the diamond element.

FIG. 4 shows a schematic view of a high speed polishing scaife 30 onto which the diamond element 2 can be pressed by means of an automated polishing arm 31 in order to polish a flat surface 32 opposite the spherically shaped surface 10.

The diamond element 2 is removed from the rod 11 on which it was mounted for the steps shown in FIGS. 1 and 2. This can be achieved by heating the assembly above the melting temperature of the solder or braze with which the diamond is mounted, or alternatively by dissolving the rod 11 in, for example, a mixture of nitric and sulphuric acid in water. The element 2 is then mounted in a holder 33 with a spherical cup that matches the radius of curvature of the spherical surface of the element. The element can be held in place in the cup by applying a vacuum between the element and the cup. Alternatively, a super-hemispherical element can be pressed into the cup by a thin metal plate having an appropriate size hole, through which the element extends.

The holder 33 is then placed in the polishing arm 31, and lowered towards the polishing scaife 30. The scaife 30 may be made from cast-iron or phosphor-bronze, or may be a resin-bond polishing wheel. The polishing arm 31 is lowered towards the scaife 30 wheel by means of an air pressure driven piston and cylinder with a reproducible speed and at right angles to the surface of the scaife. By adjusting the air-pressure, the force with which the diamond element 2 is pressed against the scaife can be adjusted. In addition, the polishing arm 31 can be moved away from the scaife with the air-pressure driven piston and cylinder.

In an alternative embodiment, the force with which the polishing arm 33 holding the diamond element 2 is pressed onto the polishing scaife can be adjusted by means of a spring, whose tension can be controlled by a lead screw. Polishing may be carried out in steps, where each polishing step is applied for a controlled period of time (adjustable, for example, in increments of 10 seconds). The thickness can then be measured in between steps, for example by means of a Heidenhain displacement meter with an internal glass ruler that measures to an accuracy of 0.1 µm. It is thus possible to polish off diamond layers in a repeatable fashion and adjust the thickness of the element 2 to within 0.1-0.2 µm.

If a smaller radius of curvature is required for the second side, the element 2 is mounted in a metal holder with a spherical cup that matches the radius of curvature of the first spherical surface 10, and soldered or brazed in place. In preferred embodiments an alloy of gold and tantalum or of copper, silver and titanium is used, and the holder is made from molybdenum or tungsten carbide. A substantially spherical surface is then laser cut onto the diamond element using a method similar to that described above with reference to FIG. 2, and the spherical surface improved using a method similar to that described with reference to FIG. 3. The diamond element 2 is then removed from the metal holder by heating the assembly above the melting temperature of the solder or braze, or by dissolving the metal chemically, and a double convex element is produced.

By suitably combining steps in the manner described above, it is also possible to form a complete sphere.

The embodiments described above have generally related to the production of a polycrystalline diamond element with a spherical surface which is a significant portion of a whole sphere for use as a tool tip in a metrology apparatus. For this application, mechanical characteristics are important. Resistance to wear is a particularly important factor.

As described above, the sphericity and surface roughness can be controlled to a very high specification.

In addition, boron doping of diamond may reduce the wear rate, which is a useful property in metrology applications. However, it is beneficial that any boron doping is uniform throughout the diamond element: otherwise the spherical surface cutting and polishing processes may result in an uneven surface. In addition, an uneven wear rate enhanced by non-uniform boron doping is undesirable in the tool tip itself. It is therefore preferred that diamond elements for use as metrology tool tips are formed from CVD diamond uniformly doped with boron, as described, for example, in WO 03/052174.

It will be further appreciated that diamond elements having spherical surfaces formed thereon may also be useful in a number of other applications, including those described earlier.

EXAMPLES

Example 1

Super-Hemispherical Synthetic CVD-Grown Single-Crystal Diamond SIL with 8-Sided Pavilions A super-hemispherical solid immersion lens (SIL) was made from CVD-grown synthetic single-crystal diamond. A CVD grown diamond, approximately 4.5×4.5×3 mm in size, was first sawn into plates of approx. 1.2 mm thick. One plate was then polished flat on one side and mounted onto a graphite carrier plate and placed on an XY translation stage in the focus of a pulsed Nd:YAG cutting laser. Pulse energy was 1.2 mJ in a 150 ns pulse with a pulse repetition rate of 4000 pps (pulses per second). The XY-stage then executed a circular motion with diameter 1.3 mm so that a cylindrical disc was cut out of the plate with diameter 1.3 mm.

Subsequently the disc was cleaned to remove any laser residue and brazed with the polished side onto a molybdenum rod which was 20 mm long and 3 min in diameter with a eutectic alloy of gold and tantalum. The axis had a tapered end such that at the tip where the diamond was soldered its diameter was 0.7 mm. Prior to brazing, the diamond disc was placed on the tip of the molybdenum rod and centred with respect to the symmetry axis of the molybdenum rod to within 0.07 mm.

Subsequently the rod was mounted in a high-speed rotational spindle and this spindle was placed on an XY-translation stage near the focus of the Nd:YAG cutting laser with its axis perpendicular to the incoming light beam. Pulse energy was 1.2 mJ in a 150 ns pulse with a pulse repetition rate of 4000 pps. The spindle rotated at 550 rpm. The XY-stage executed a circular motion over approximately ⅜ the circumference of a circle in a bi-directional movement in a plane perpendicular to the incoming focused laser beam at a linear speed of 5 mm/min. Slight corrections to the circular motion were applied when cutting close to the axis of rotation, otherwise a slightly flattened surface would be cut out due to the low speed of rotational motion close to the rotation axis. Thus a super-hemispherical surface with a radius of 0.47 mm was cut out of the disc with deviations from an ideal spherical surface of less than 5 µm. RMS surface roughness ($R_q$) was approximately 1.4 µm The diamond super-hemisphere on its molybdenum rod was then mounted on a rotary stage, which rotated at 20 rpm. A resin-bond cup mounted on a high-speed rotary spindle, which ran at 20000 rpm, was pressed against it with a force of 4 N. The resin-bond cup was made out of a disc of diamond-filled resin material with mean diamond particle size between 20 and 40 µm, in which a central hole of 300 µm in diameter was made. The disc was pressed against the pre-cut diamond sphere and during the polishing process the disc obtained a spherical shape, matching the radius of the diamond sphere. The high-speed spindle was mounted on a rotary arm, which could rotate around an axis of rotation that intersected the symmetry axis of the diamond sphere on the molybdenum rod at the centre of curvature of the diamond sphere. At this stage this arm was not moving but kept still at a fixed position and care was taken to adjust the angle of the arm such that the resin-bond disc made contact over an area that covered the apex of the diamond super-hemisphere up till the edge of the super-hemispherical surface. In this manner a super-hemispherical diamond surface was polished with deviations from an ideal spherical surface smaller than 2 µm, RMS surface roughness was less than 1.5 nm.

Subsequently the resin-bond cup was replaced by a disc of PCD Syndite® with a 2 µm mean diamond particle size. The disc had a central hole of 400 µm and was mounted in a carrier that mounted in the high-speed rotary spindle. The PCD disc was pressed against the diamond super-hemisphere with a force of 3 N. The spindle was rotating first at 10000 rpm and after 4 hours this was reduced to 6000 rpm. The arm on which the spindle was mounted was set to rotate over approximately 50° in a bidirectional motion. After a further 6 hours of polishing, a super-hemispherical surface was obtained with a radius of curvature of 0.45 mm and a maximum deviation from the ideal spherical surface of less than 45 nm. The RMS deviation as measured over the surface of the super-hemispherical surface from the ideal spherical surface was equal to 5.6 nm. For another super-hemispherical diamond surface, prepared in an identical fashion, the RMS deviation was 7.3 nm, while for yet another sample the RMS deviation was 5.4 nm.

The diamond was then removed from the molybdenum rod by dissolving the molybdenum in a mixture of nitric and sulphuric acid in water and, after rinsing in demineralised water and drying, was mounted in a sub-hemispherical cup made into the form of a 'brass pen' (that is a rod with a central hole through which to apply vacuum, and a concave cup at one end to hold the diamond lens) with a vacuum holding the diamond in place. Subsequently, the pen with the diamond was mounted in a polishing arm and was pressed onto a resin bond wheel with 20-40 µm average particle size, rotating with a linear speed of 3 m/s. The force with which the diamond was pressed against the resin bond wheel was kept constant at 2 N. Initially, when the diamond lens was more than 200 µm thicker than the desired thickness, polishing was done rapidly. When the thickness of the diamond lens was approximately 3 µm above the target thickness, diamond was polished off in steps of approximately 0.1 µm. For this diamond super-hemispherical SIL the radius of curvature was measured as 448.9 µm and the target thickness was 631.6 µm. Final thickness was to within 0.1 µm of the target thickness Subsequently the diamond lens was soldered onto a molybdenum holder with a conically shaped hole using a eutectic alloy of copper, silver, and titanium. This pen was then mounted in a tang used for polishing diamond anvils and 8-sided pavilion facets were polished onto the diamond lens at an angle of 85° with the normal to the flat surface. A central, octagonally shaped area was left untouched, so that the centre thickness was not changed from the thickness to which it was polished in the previous step. Finally, the diamond SIL was removed from the molybdenum holder by dissolving the molybdenum in a mixture of nitric and sulphuric acid in water and subsequently rinsed in demineralised water and dried.

Example 2

Hemispherical Synthetic CVD-Grown Single-Crystal Diamond SIL

A hemispherical SIL was made from CVD-grown synthetic single-crystal diamond. A CVD grown diamond, approximately 3×3×2.8 mm in size, was first sawn into plates of approx. 0.8 mm thick. One plate was then polished on one side and mounted onto a graphite carrier plate and placed on an XY translation stage in the focus of a pulsed. Nd:YAG cutting laser. Pulse energy was 1.2 mJ in a 150 ns pulse with a pulse repetition rate of 4,000 pps. The XY-stage then executed a circular motion with diameter 1.4 mm so that a cylindrical disc was cut out of the plate with diameter 1.4 mm.

Subsequently the disc was cleaned to remove any laser residue and brazed on the polished side onto a molybdenum rod which was 30 mm long and 3 mm in diameter with a eutectic alloy of gold and tantalum. The rod had a tapered end such that at the tip where the diamond was soldered its diameter was 0.8 mm. Prior to brazing the diamond disc was placed on the tip of the molybdenum rod centred with respect to the symmetry axis of the molybdenum rod to within 0.1 mm.

Subsequently the rod was mounted in a high-speed rotational spindle and this spindle was placed on an XY-translation stage near the focus of the Nd:YAG cutting laser with its axis perpendicular to the incoming light beam, Pulse energy was 1.2 mJ in a 150 ns pulse with a pulse repetition rate of 4,000 pps. The spindle rotated at 550 rpm. The XY-stage executed a motion corresponding to slightly more than a quarter circle in a bi-directional movement in a plane perpendicular to the incoming focused laser beam at a linear speed of 5 mm/min. Slight corrections to the circular motion were applied when cutting close to the axis of rotation, otherwise a slightly flattened surface would be cut out due to the low speed of rotational motion close to the rotation axis. Thus a hemispherical surface with a radius of 0.52 mm was cut out of the disc with deviations from an ideal spherical surface of less than 7 μm, RMS surface roughness ($R_q$) was approximately 2 μm.

The diamond hemisphere on its molybdenum rod was then mounted on a rotary stage, which rotated at 20 rpm. A resin-bond cup mounted on a high-speed rotary spindle, which ran at 20,000 rpm, was pressed against it with a force of 4 N. The resin-bond cup was made out of a disc of diamond-filled resin material with mean diamond particle size between 20 and 40 μm, in which a central hole of 400 μm in diameter was made. The disc was pressed against the pre-cut diamond sphere, and during the polishing process the disc obtained a spherical shape, matching the radius of the diamond sphere. The high-speed spindle was mounted on a rotary arm, which could rotate around an axis of rotation that intersected the symmetry axis of the diamond sphere on the molybdenum rod at the centre of curvature of the diamond sphere. At this stage, this arm was not moving but kept still at a fixed position and care was taken to adjust the angle of the arm such that the resin-bond disc made contact over an area that covered the apex of the diamond hemisphere up till the edge of the hemispherical surface. In this manner a hemispherical diamond surface was polished with deviations from an ideal spherical surface smaller than 2 μm, RMS surface roughness was less than 1.5 nm.

Subsequently the resin-bond cup was replaced by a disc of PCD Syndite® with a 2 μm mean diamond particle size. The disc had a central hole of 600 μm and was mounted in a carrier that mounted in the high-speed rotary spindle. The PCD disc was pressed against the diamond hemisphere with a force of 3 N. The spindle rotated initially at 12,000 rpm, and this was reduced to 6,000 rpm after 3 hours. The arm on which the spindle was mounted was set to rotate over approximately 50° in a bidirectional motion. After a further 4 hours of polishing a hemispherical surface was obtained with a radius of curvature of 0.50 mm and a maximum deviation from the ideal spherical surface of less than 70 nm. The RMS deviation as measured over the surface of the hemispherical surface from the ideal spherical surface was less than 12 nm.

The diamond was then removed from the molybdenum rod by heating the assembly above the melting temperature of the solder with which the diamond was mounted and, after rinsing in demineralised water and drying, was mounted in a sub-hemispherical cup made into the form of a 'brass pen' with a vacuum holding the diamond in place. Subsequently the pen with the diamond was mounted in a polishing arm and was pressed onto a resin-bond polishing scaife with 20-40 μm average particle size, rotating with a linear speed of 5 m/s. The force with which the diamond was pressed against the resin-bond scaife was kept constant at 2 N. Initially, when the diamond lens was more than 200 μm thicker than the desired thickness, polishing was done rapidly. When the thickness of the diamond lens was approximately 3 μm above the target thickness, diamond was polished off in steps of approximately 0.2 μm. For this diamond hemispherical SIL the radius of curvature was measured as 502.1 μm and the target thickness was 706.4 μm. Final thickness was to within 0.5 μm of the target thickness.

Example 3

Biconvex Natural IIa Type Single-Crystal Diamond Lens of which One Surface has a Hemispherical Shape A hemispherical diamond surface was made from natural type IIa single-crystal diamond. A type IIa diamond, approximately 4 ct in size, was first sawn into plates of approx. 0.95 mm thick. One plate was then polished on one side and mounted onto a graphite carrier plate and placed on an XY translation stage in the focus of a pulsed Nd:YAG cutting laser. Pulse energy was 1.2 mJ in a 150 us pulse with a pulse repetition rate of 4,000 pps. The XY-stage then executed a circular motion with diameter 1.6 mm so that a cylindrical disc was cut out of the plate with diameter 1.6 mm.

Subsequently the disc was cleaned to remove any laser residue and brazed with the polished side onto a molybdenum rod which was 30 mm long and 3 mm in diameter with a eutectic alloy of gold and tantalum. The rod had a tapered end such that at the tip where the diamond was soldered its diameter was 1.2 mm. Prior to brazing, the diamond disc was placed on the tip of the molybdenum rod centred with respect to the symmetry axis of the molybdenum rod to within 0.1 mm.

Subsequently the rod was mounted in a high-speed rotational spindle and this spindle was placed on an XY-translation stage near the focus of the Nd:YAG cutting laser with its axis perpendicular to the incoming light beam. Pulse energy was 1.2 mJ in a 150 ns pulse with a pulse repetition rate of 4000 pps. The spindle rotated at 600 rpm. The XY-stage executed a motion corresponding to slightly more than a quarter circle in a bi-directional movement in a plane perpendicular to the incoming focused laser beam at a linear speed of 6 mm/min. Thus a hemispherical surface with a radius of 0.72 mm was cut out of the disc with deviations from an ideal spherical surface of less than 10 μm. RMS surface roughness ($R_q$) was approximately 3 μm.

The diamond hemisphere on its molybdenum rod was then mounted on a rotary stage, which rotated at 10 rpm. A resin-bond cup mounted on a high-speed rotary spindle, which ran at 20,000 rpm, was pressed against it with a force of 6 N. The resin-bond cup was made out of a disc of diamond-filled resin material with mean diamond particle size between 20 and 40 μm, in which a central hole of 600 μm in diameter was made. The disc was pressed against the pre-cut diamond sphere and during the polishing process the disc obtained a spherical shape, matching the radius of the diamond sphere. The high-speed spindle was mounted on a rotary arm, which could rotate around an axis of rotation that intersected the symmetry axis of the diamond sphere on the molybdenum rod at the centre of curvature of the diamond sphere. This arm was not moving but kept still at a fixed position and care was taken to adjust the angle of the arm such that the resin-bond disc made contact over an area that covered the apex of the diamond hemisphere up till the edge of the hemispherical surface. In this manner a hemispherical diamond surface was polished with deviations from an ideal spherical surface smaller than 2 μm. RMS surface roughness was less than 1.5 nm.

Subsequently the diamond was removed from the molybdenum rod by heating the assembly above the melting temperature of the solder with which the diamond was mounted and after rinsing in demineralised water and drying, it was epoxied into a sub-hemispherical cup with an appropriate radius matching the radius of the diamond hemispherical surface, made into the form of an 'aluminium pen'. Two-component resin-type epoxy was used with a curing time of approximately 2 hrs. Before curing, care was taken that the normal to the polished flat surface coincided with the rotational symmetry axis of the brass pen.

After this the pen and diamond were mounted in a high-speed rotational spindle and this spindle was placed on an XY-translation stage near the focus of the Nd:YAG cutting laser with its axis perpendicular to the incoming light beam. Pulse energy was 1.2 mJ in a 150 ns pulse with a pulse repetition rate of 4000 pps. The spindle rotated at 500 rpm. The XY-stage executed a motion corresponding to slightly more than an arc of a circle, subtending approx. 10°, in a bi-directional movement in a plane perpendicular to the incoming focused laser beam at a linear speed of 5 mm/min. Slight corrections to the circular motion were applied when cutting close to the axis of rotation, otherwise a slightly flattened surface would be cut out due to the low speed of rotational motion close to the rotation axis. Thus a spherical surface with a radius of 13.2 mm was cut out of the disc with deviations from an ideal spherical surface of less than 5 μm. RIMS surface roughness ($R_q$) was approximately 1.5 μm.

Subsequently the aluminium pen with the diamond was mounted on a rotary stage, which rotated at 6 rpm. A resin-bond cup mounted on a high-speed rotary spindle, which ran at 20000 rpm, was pressed against it with a force of 6 N. The resin-bond cup was made out of a disc of diamond-filled resin material with mean diamond particle size between 20 and 40 μm, in which a central hole of 600 μm in diameter was laser cut. The disc was pressed against the pre-cut diamond sphere and during the polishing process the disc obtained a spherical shape, matching the radius of the diamond sphere. The high-speed spindle was mounted on a rotary arm, which could rotate around an axis of rotation that intersected the symmetry axis of the diamond sphere on the molybdenum rod at the centre of curvature of the diamond sphere. This arm was not moving but kept still at a fixed position and care was taken to adjust the angle of the aim such that the resin-bond disc made contact over an area that covered the apex of the diamond hemisphere up till the edge of the hemispherical surface. In this manner a hemispherical diamond surface was polished with deviations from an ideal spherical surface smaller than 2 μm. RMS surface roughness was less than 1.5 nm. The lens was then dismounted from the aluminium pen by heating it above 250° C. until the epoxy had softened and the diamond could be removed. It was subsequently chemically cleaned to remove traces of epoxy.

This lens when illuminated at normal incidence by a parallel beam of light at 632 nm showed spherical aberration in conformance with the values expected for an ideal lens with identical nominal shape. Therefore the performance of the lens was close to ideal.

Example 4

Synthetic CVD-Grown Single-Crystal Diamond Metrology Tip Mounted on Tungsten Carbide Rod A sub-hemispherical SIL was made from CVD-grown synthetic single-crystal diamond. From a CVD grown diamond, approximately 4.5×4.5×3 mm in size, a plate of approx. 1.7 mm thick was first sawn. The plate was then polished flat on one side and mounted onto a graphite carrier plate and placed on an XY translation stage in the focus of a pulsed Nd:YAG cutting laser, Pulse energy was 1.2 mJ in a 150 ns pulse with a pulse repetition rate of 4000 pps. The XY-stage then executed a circular motion with diameter 3.3 mm so that a cylindrical disc was cut out of the plate with diameter 3.3 mm.

Subsequently the disc was cleaned to remove any laser residue and brazed with the polished side onto a tungsten carbide rod which was 50 mm long and 5 mm in diameter with a eutectic alloy of gold and germanium. The rod had a tapered end such that at the tip where the diamond was soldered its diameter was 2.7 mm. Prior to brazing, the diamond disc was placed on the tip of the tungsten carbide rod centred with respect to the symmetry axis of the tungsten carbide rod to within 0.1 mm.

Subsequently the tungsten carbide rod was mounted in a high-speed rotational spindle and this spindle was placed on an XY-translation stage near the focus of the Nd:YAG cutting laser with its axis perpendicular to the incoming light beam. Pulse energy was 1.2 mJ in a 150 ns pulse with a pulse repetition rate of 4000 pps. The spindle rotated at 300 rpm. The XY-stage executed a circular motion over approximately 3/16th the circumference of a circle in a bi-directional movement in a plane perpendicular to the incoming focused laser beam at a linear speed of 5 mm/min, Slight corrections to the circular motion were applied when cutting close to the axis of rotation, otherwise a slightly flattened surface would be cut out due to the low speed of rotational motion close to the rotation axis. Thus a sub-hemispherical surface with a radius of 1.52 mm was cut out of the disc with deviations from an ideal spherical surface of less than 5 μm. RMS surface roughness ($R_q$) was approximately 1.4 μm The diamond sub-hemisphere on its tungsten carbide rod was then mounted on a rotary stage, which rotated at 10 rpm. A resin-bond cup mounted on a high-speed rotary spindle, which ran at 15000 rpm, was pressed against it with a force of 6 N. The resin-bond cup was made out of a disc of diamond-filled resin material with mean diamond particle size between 20 and 40 μm, in which a central hole of about 1200 μm in diameter was made. The disc was pressed against the pre-cut diamond sphere and during the polishing process the disc obtained a spherical shape, matching the radius of the diamond sphere. The high-speed spindle was mounted on a rotary arm, which could rotate around an axis of rotation that intersected the symmetry axis of the diamond sphere on the molybdenum rod at the centre of curvature of the diamond sphere. At this stage this arm was not moving but kept still at a fixed position and care was taken to adjust the angle of the arm such that the resin-bond disc made contact over an area that covered the apex of the diamond sub-hemisphere up till the edge of the sub-hemispherical surface. In this manner a sub-hemispherical diamond surface was polished with deviations from an ideal spherical surface smaller than 2 μm, RMS surface roughness was less than 1.5 nm.

Subsequently the resin-bond cup was replaced by a disc of PCD Syndite® with a 2 μm mean diamond particle size. The disc had a central hole of 1200 μm and was mounted in a carrier that was mounted in the high-speed rotary spindle. The PCD disc was pressed against the diamond sub-hemisphere with a force of 6 N. The spindle was rotating first at 10000 rpm and after 4 hours this was reduced to 4000 rpm. The arm on which the spindle was mounted was set to rotate over approximately 50° in a bidirectional motion. After a further 10 hours of polishing a sub-hemispherical surface was obtained with a radius of curvature of 1.5 mm and a maximum deviation from the ideal spherical surface of less than 100 nm. The RMS deviation as measured over the surface of the sub-hemispherical surface from the ideal spherical surface was equal to 9.1 nm.

This diamond metrology tip was not removed from the tungsten-carbide rod it was mounted on since the rod could be used as the mount for the tip when used for measurement of surface shape and roughness. The conical half-angle subtended by the diamond spherical surface from its centre of curvature was approximately 60°.

Example 5

Comparative Performance of Diamond and Materials Currently Used in the Art

The performance of the diamond spheres is compared against the performance of materials currently used in the art using an aluminium adhesion test.

The materials currently used in the art that are tested include sapphire, ruby, zirconium oxide and silicon nitride.

Figure 5:
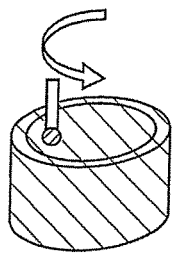
FIG. 5 shows a schematic of the measurement set-up for full spheres. The cross-hatching indicates a sphere and an aluminium cylinder.

FIG. 5 shows a schematic of the measurement set-up for full spheres.

The spheres are of sapphire, ruby, zirconium oxide and silicon nitride are all approximately 1.5 mm in radius. The surface roughness $R_a$ of the sapphire, ruby, zirconium oxide and silicon nitride spheres is specified as being better than 25 nm, and more typically have an $R_a$ of about 5 nm. The sphere under test is pressed with approximately 100 mN on the inner surface of the aluminium cylinder. The cylinder is stationary, and the sphere makes a circular motion without rotating on its axis. The velocity of the aluminium surface with respect to the sphere is approximately 6 mm/s. In each case, the sliding distance was 25 m.

Figure 6:
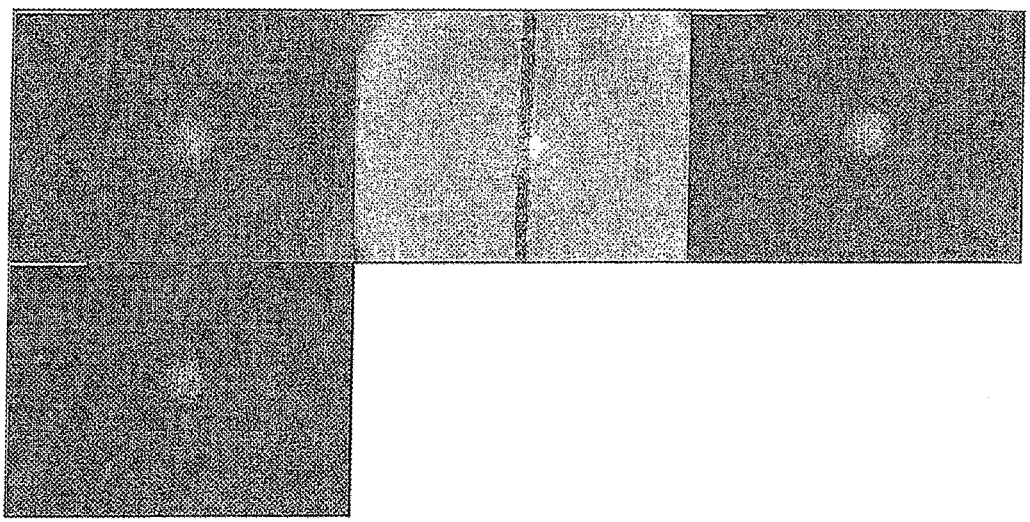
FIG. 6 shows the aluminium track on the spheres, measured according to the aluminium adhesion test illustrated in FIG. 5. The aluminium appears to be chemically bonded to the spheres: it was not easy to remove it by cleaning with for instance isopropyl alcohol. From left to right: Ruby, sapphire, $ZrO_2$ and $Si_3N_4$ spheres after 25 m track. Photographs taken at 50× magnification.

FIG. 6 shows the aluminium track on the spheres. The aluminium appears to be chemically bonded to the spheres: it was not easy to remove it by cleaning with for instance isopropyl alcohol.

The solid diamond and diamond-coated materials were tested using one of three methods:
a) The first uses the method described above for Ruby, but using diamond tips. These tips can be solid polycrystalline diamond, or more preferably polycrystalline diamond coated tips.
b) Measurement set-up for curved surface. This second method uses spherical segments of diamond coated material, such as diamond coated tungsten, where the radius of curvature is much larger.

Figure 7:
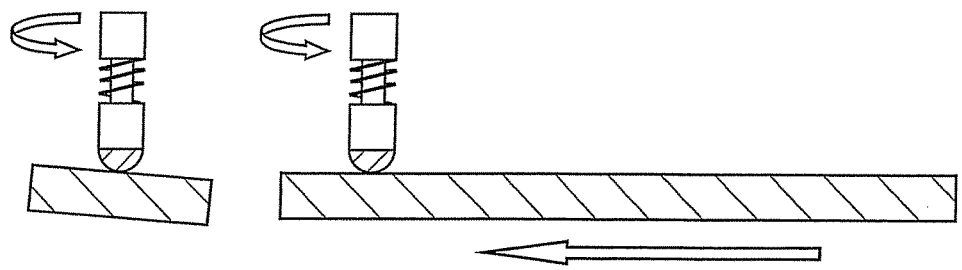
FIG. 7 shows a schematic of the test set-up for curved surfaces. The curved part is the diamond coated part, the flat part is aluminium. Left and right pictures show perpendicular views.

The radius of curvature of the coated part is 125 mm, and its surface roughness is about 60 nm. The surface is pressed on to an aluminium strip with a force of between 100 mN and 200 mN. It is rotated on the workpiece, and the workpiece is slowly moved under the coated part. The relative velocity is approximately 14 mm/s. FIG. 7 shows a schematic of the test set-up for curved surfaces.
c) Measurement set-up for flat surface. This third method uses planar diamond samples in contact with curved test pieces such as Al.

Figure 8:
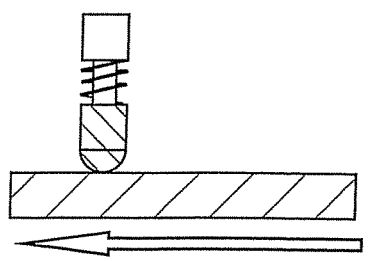
FIG. 8 shows a schematic of the test set-up for flat surfaces. Here, the flat part is the diamond coated part, the curved part is aluminium.

A curved aluminium piece is pressed on a flat, coated piece. The aluminium is stationary, and the coated part makes a circular motion. The radius of curvature of the aluminium is about 7.5 mm. The surface roughness $R_a$ of the coated part is approximately 1 nm. The contact force is between 100 mN and 200 mN and the relative velocity is approximately 6 mm/s. FIG. 8 shows a schematic of the test set-up for flat surfaces.

Figure 9:
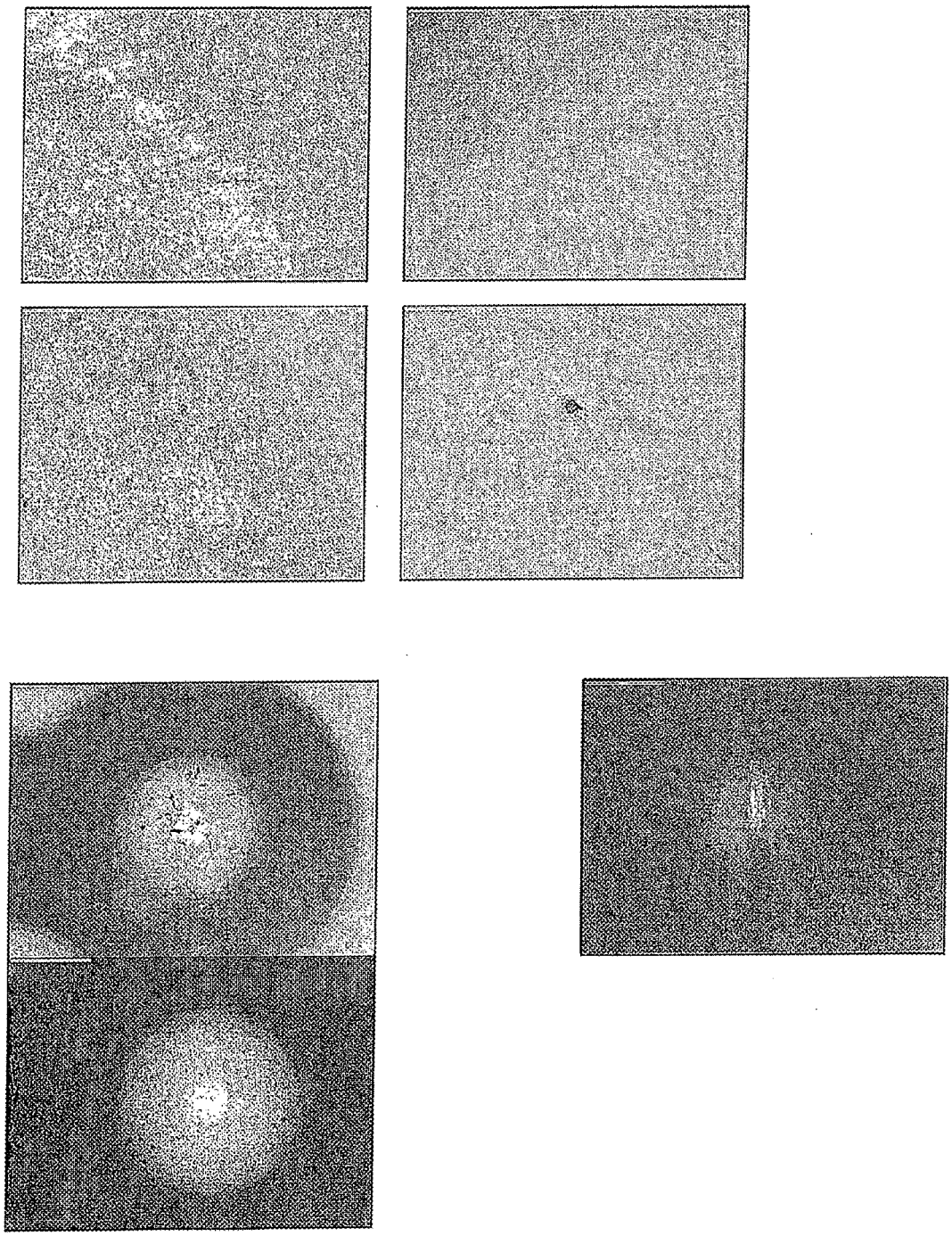
FIG. 9 shows, from left to right: Coated curved surface and coated flat surface after 25 m, measured with 50× magnification. Top row measured at 50× magnification, bottom row at 200× magnification.

FIG. 9 shows the aluminium tracks on the coated diamond parts. These tracks are far less clear than in the case of for instance a sapphire sphere. Also, most of the aluminium can be removed by simply cleaning the piece with isopropanol. In the case of the curved part, the aluminium was mainly present in the pits on the surface.

For the measurements on diamond spheres, the set-up in FIG. 5 was used. The single crystal diamond spheres had a radius of approximately 1.5 mm; the polycrystalline diamond spheres were slightly smaller due to material constraints. The polished polycrystalline spheres were estimated to have an $R_a$ of less than 10 nm, lapped single crystal spheres were estimated to have an $R_a$ of less than 200 nm and the polished single crystal spheres were estimated to have an $R_a$ of less than 5 nm. As reliable roughness measurement of the diamond spheres were not possible, these estimated values are based on what the applicants routinely measure on less curved pieces of these materials. The polished single crystal sphere was not of the best possible quality: it contained several large pits in the surface. These pits are clearly visible in the photographs.

Figure 10:
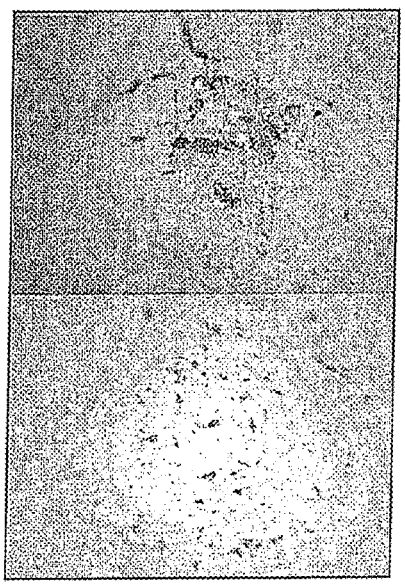
FIG. 10 shows, from left to right: Polished polycrystalline, lapped single crystal and polished single crystal diamond spheres after 25 m track. Top row photographs taken at 50× magnification, bottom row 200× magnification.
Figure 10:
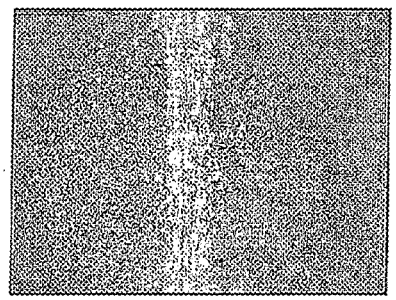

FIG. 10 shows the result of the full diamond spheres. The polished single crystal sphere outperforms all other materials that were tested; but from the picture of the lapped sphere it is clear that the surface roughness also plays an important part in the aluminium adhesion.

The results are summarised in Table 1.

TABLE 1

| | Material | Radius (mm) | Roughness ($R_a$, nm) | Force (mN) | Velocity (mm/sec) | Result |
|---|---|---|---|---|---|---|
| 1 | Smooth single crystal CVD diamond | 1.5 | <5 | 100 | 6 | Excellent |
| 2a | Polycrystalline CVD diamond coated flat | 7.5 | 1-2 | 100-200 | 6 | Good |
| 2b | Solid polycrystalline CVD diamond sphere | 1.4 | <10 | 100 | 6 | Good |
| 3 | Polycrystalline CVD diamond coated curve | 125 | 60 | 100-200 | 14 | Fair |
| 4 | Rough single crystal CVD diamond | 1.5 | <200 | 100 | 6 | Bad |
| 5 | Zirconia | 1.5 | <25 | 100 | 6 | Bad |
| 6 | Silicon Nitride | 1.5 | <25 | 100 | 6 | Bad |

TABLE 1-continued

| | Material | Radius (mm) | Roughness ($R_a$, nm) | Force (mN) | Velocity (mm/sec) | Result |
|---|---|---|---|---|---|---|
| 7 | Ruby | 1.5 | <25 | 100 | 6 | Bad |
| 8 | Sapphire | 1.5 | <25 | 100 | 6 | Bad |

The results of the comparative tests show that the performance of the several types of polished CVD diamond tested are significantly better that the results from the materials currently used in the art. It is clear that the material and the surface roughness are two determining factors in the adhesion of aluminium.

The solid polycrystalline diamond and polycrystalline diamond coating demonstrate a performance comparable to the smooth single crystal diamond and much better than the materials currently used in the art and the rough single crystal diamond sample. The performance of the smooth single crystal diamond sphere was slightly better than the performance of the polycrystalline diamond sphere, but this is believed to be due to the better surface finish on the smooth single crystal diamond sphere.

Example 6

Fabrication of a Solid Polycrystalline CVD Diamond Super-Hemispherical Measurement Stylus A super-hemispherical measurement stylus was made from CVD-grown synthetic polycrystalline diamond. A CVD grown polycrystalline diamond plate, approximately 4.0×4.0×2.5 mm in size, was cut from a larger wafer. The plate was then polished flat on one side and mounted onto a graphite carrier plate and placed on an XY translation stage in the focus of a pulsed Nd:YAG cutting laser. Pulse energy was 1.2 mJ in a 150 ns pulse with a pulse repetition rate of 4000 pps (pulses per second). The XY-stage then executed a circular motion with diameter 3.0 mm so that a cylindrical disc was cut out of the plate with diameter 3.0 mm.

Subsequently the disc was cleaned to remove any laser residue and brazed with the polished side onto a molybdenum rod which was approximately 20 mm long and approximately 3 mm in diameter with a eutectic alloy of gold and tantalum. The axis had a tapered end such that at the tip where the diamond was soldered its diameter was approximately 0.7 mm. Prior to brazing, the diamond disc was placed on the tip of the molybdenum rod and centred with respect to the symmetry axis of the molybdenum rod to within about 0.07 mm.

Subsequently the rod was mounted in a high-speed rotational spindle and this spindle was placed on an XY-translation stage near the focus of the Nd:YAG cutting laser with its axis perpendicular to the incoming light beam. Pulse energy was nominally 1.2 mJ in a 150 ns pulse with a pulse repetition rate of 4000 pps. The spindle rotated at 550 rpm. The XY-stage executed a circular motion over approximately ⅜ the circumference of a circle in a bi-directional movement in a plane perpendicular to the incoming focused laser beam at a linear speed of 5 mm/min. Slight corrections to the circular motion were applied when cutting close to the axis of rotation, otherwise a slightly flattened surface would be cut out due to the low speed of rotational motion close to the rotation axis. Thus a super-hemispherical surface with a radius of 1.4 mm was cut out of the disc with deviations from an ideal spherical surface of less than 5 μm. The surface roughness ($R_a$) was approximately 1.4 μm.

The diamond super-hemisphere on its molybdenum rod was then mounted on a rotary stage, which rotated at 20 rpm. A resin-bond cup mounted on a high-speed rotary spindle, which ran at 20000 rpm, was pressed against it with a force of about 4 N. The resin-bond cup was made out of a disc of diamond-filled resin material with mean diamond particle size between 20 and 40 μm, in which a central hole of 300 μm in diameter was made. The disc was pressed against the pre-cut diamond sphere and during the polishing process the disc obtained a spherical shape, matching the radius of the diamond sphere. The high-speed spindle was mounted on a rotary arm, which could rotate around an axis of rotation that intersected the symmetry axis of the diamond sphere on the molybdenum rod at the centre of curvature of the diamond sphere. At this stage this arm was not moving but kept still at a fixed position and care was taken to adjust the angle of the arm such that the resin-bond disc made contact over an area that covered the apex of the diamond super-hemisphere up till the edge of the super-hemispherical surface. In this manner a super-hemispherical diamond surface was polished with deviations from an ideal spherical surface smaller than 2 μm. The surface roughness $R_q$, measured using an AFM over an area of approximately 1 μm×1 μm, was significantly less than 10 nm.

Subsequently the resin-bond cup was replaced by a disc of PCD Syndite® with a 2 μm mean diamond particle size. The disc had a central hole of 400 μm and was mounted in a carrier that mounted in the high-speed rotary spindle. The PCD disc was pressed against the diamond super-hemisphere with a force of 3 N. The spindle was rotating first at 10000 rpm and after 4 hours this was reduced to 6000 rpm. The arm on which the spindle was mounted was set to rotate over approximately 50° in a bidirectional motion. After a further 6 hours of polishing, a super-hemispherical surface was obtained with a radius of curvature of 1.4 mm and a maximum deviation from the ideal spherical surface of less than 45 nm. The RMS deviation as measured over the surface of the super-hemispherical surface from the ideal spherical surface was equal to 5.6 nm. For another super-hemispherical diamond surface, prepared in an identical fashion, the RMS deviation was 7.3 nm, while for yet another sample the RMS deviation was 5.4 nm.

The polycrystalline CVD diamond super-hemisphere prepared by the above method was mounted on a suitable holder for use in comparative performance tests.

Example 7

Fabrication of a CVD Diamond Coated Spherical Measurement Styli

Methods for the coating of suitable spherical substrates are known in the art. A silicon carbide sphere with a diameter of 3 mm and made of a reaction-bonded silicon carbide (for example REFEL R®) is surface prepared, seeded and coated with a layer of polycrystalline diamond approximately 20 μm thick using techniques known in the art. The roughness $R_q$ of an as-grown polycrystalline CVD diamond layer is typically about 10% of its thickness, hence a 20 μm thick layer will have a surface roughness $R_q$ of about 2 μm.

The as-grown surface of the sphere is lapped and polished according to the method described in Example 6, more specifically using the techniques applied after the completion of the laser shaping of the blank to lap and polish a super-hemispherical portion of the surface with an included half angle of between about 115° and about 160°. Alternatively, by using multiple lapping and polishing steps to ensure that the whole surface of the sphere is lapped and polished, a sphere with a surface that is fully polished may be made. The CVD diamond coated sphere after completion of the lapping and polishing processes has an $R_q$, measured using an AFM over an area of 1 μm×1 μm, of less than about 10 nm and a maximum deviation from sphericity of less than 50 nm and an RMS deviation from sphericity of less than 10 nm.

The finished object thus consists of a spherical substrate with a polycrystalline CVD diamond coating that has lapped and polished to a high degree of sphericity and a very low surface roughness $R_q$ over the whole surface or over a super-hemispherical portion of the surface. The finished object can be attached to a suitable stem by, for example, brazing and used as a stylus for a measurement probe.

Example 8

Comparative Performance of Diamond and Materials Currently Used in the Art

The performance of polycrystalline diamond super-hemispheres of the present invention is compared against the performance of materials currently used in the art as tips for measurement probes using an aluminium adhesion test.

The material under test is moved against an aluminium surface under a set load and for a set distance and the amount of material that is picked up from the aluminium is measured. The aluminium adhesion test is considered a suitable test as one of the major uses of measurement styli is for measuring the dimensions of precision machined aluminium components (e.g. components for internal combustion engines).

The performance of a solid polycrystalline CVD diamond super-hemisphere was compared with the performance of four materials currently used in the art, namely sapphire, ruby, zirconium oxide and silicon nitride. As a further comparison, a smooth solid single crystal CVD diamond super-hemisphere and a rough solid single crystal CVD diamond super-hemisphere were also tested.

The polycrystalline CVD diamond super-hemisphere had a radius of 1.4 mm and a surface roughness $R_a$ of less than 10 nm. The spheres of sapphire, ruby, zirconium oxide and silicon nitride were all approximately 1.5 mm in radius. The surface roughness $R_a$ of the sapphire, ruby, zirconium oxide and silicon nitride spheres is specified as being better than 25 nm, and more typically have a surface roughness $R_a$ of about 5 nm. The smooth (polished) single crystal diamond super-hemisphere had a radius of approximately 1.5 mm and a surface roughness $R_a$ of less than about 5 nm. The rough (lapped) single crystal diamond super-hemisphere had a radius of 1.5 mm and a surface roughness $R_a$ of about 200 nm.

The surface roughness Ra values were obtained using an atomic force microscope ("AFM"). The technique of using an AFM to determine surface roughness is well known in the art. As the radius of curvature of the spheres is very much greater than their surface roughness $R_a$, it is straightforward to automatically deconvolute the surface roughness from the curvature and thereby provide a realistic numerical value for the surface roughness.

In the test, the super-hemisphere or sphere under test is pressed with approximately 100 mN on the inner surface of a hollow aluminium cylinder. The cylinder is stationary, and the super hemisphere or sphere makes a circular motion without rotating on its axis. The velocity of the aluminium surface with respect to the sphere is approximately 6 mm/s. The super-hemispheres or spheres were moved against the aluminium cylinder for the same distance (25 m) in all cases. FIG. 5 shows a schematic of the measurement set-up for super-hemisphere or spheres.

The amount of aluminium transferred from the surface of the aluminium cylinder to the surface of the super-hemisphere or sphere is a measure of the performance: the lower the amount of material transferred, the better the performance. The results of the tests are given in Table 2

TABLE 2

| Test Number | Material | Radius, mm | Roughness $R_a$, nm | Performance |
|---|---|---|---|---|
| 1 | Solid polycrystalline CVD diamond super-hemisphere | 1.4 | <10 | Good |
| 2 | Smooth single crystal CVD diamond super-hemisphere | 1.5 | <5 | Excellent |
| 3 | Rough single crystal CVD diamond super-hemisphere | 1.5 | ~200 | Poor |
| 4 | Zirconia sphere | 1.5 | ~5 | Poor |
| 5 | Silicon nitride sphere | 1.5 | ~5 | Poor |
| 6 | Ruby sphere | 1.5 | ~5 | Poor |
| 7 | Sapphire-sphere | 1.5 | ~5 | Poor |

The extent of the aluminium pick-up was negligible for the smooth single crystal CVD diamond super hemisphere, very low for the solid polycrystalline CVD diamond super-hemisphere (i.e. the present invention) and high for all the other samples tested.

The results of the comparative tests show that the performance of solid polycrystalline CVD diamond super-hemispheres is significantly better that the results from the spheres as used conventionally in the art. The high level of aluminium pick up observed with the rough single crystal diamond super-hemisphere, indicates that the roughness of the surface is a key factor, $R_q$ values of 200 nm being too high.

It was found that in the case of the non-diamond materials, the aluminium picked up during the test was firmly attached to the sphere, suggesting that aluminium pick-up has a chemical component.

It is clear that the diamond super-hemispheres of the present invention outperform the spheres currently available for measurements on aluminium because of the greatly reduced level of aluminium pick-up.

It will be appreciated that variations from the above described embodiments may still fall within the scope of the invention.

The invention claimed is:

1. An element of diamond material having a convex surface formed thereon, the convex surface having a root mean square roughness, $R_q$, of less than about 5 nm, wherein the convex surface includes a spherical segment for which:
    (a) the maximum peak to valley deviation from a perfect spherical surface is less than about 5 μm; and
    (b) the RMS deviation of the spherical segment, as measured by averaging the square of deviations over the spherical segment, is less than or equal to about 500 nm;
and wherein the diamond material comprises base material comprising either SiC or SiNx which is coated with a polycrystalline CVD diamond coating having a thickness of between about 10 μm and about 100 μm.

2. An element as claimed in claim 1, wherein the convex surface further has at least one of the properties from the following list:
   a radius of curvature less than about 20 mm; and
   the spherical segment has a conical half-angle greater than about 10°.

3. An element as claimed in claim 1, further comprising another convex surface on an opposite side of the element to the convex surface.

4. A metrology apparatus having a tool tip, the tool tip comprising an element as claimed in claim 1.

5. An element as claimed in claim 1, wherein the base material comprises either SiC or $Si_3N_4$.

6. An element as claimed in claim 1, wherein the base material comprises SiC.

7. An element as claimed in claim 1, wherein the base material comprises $Si_3N_4$.

* * * * *